US009023542B2

(12) United States Patent
Kaneko et al.

(10) Patent No.: US 9,023,542 B2
(45) Date of Patent: May 5, 2015

(54) FUEL CELL SYSTEM INCLUDING AN AMMONIA REMOVER AND METHOD OF OPERATING THE SAME

(75) Inventors: Hiroaki Kaneko, Osaka (JP); Koichi Kusumura, Osaka (JP); Akinori Yukimasa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 320 days.

(21) Appl. No.: 13/583,895

(22) PCT Filed: Mar. 11, 2011

(86) PCT No.: PCT/JP2011/001447
§ 371 (c)(1),
(2), (4) Date: Sep. 10, 2012

(87) PCT Pub. No.: WO2011/111400
PCT Pub. Date: Sep. 15, 2011

(65) Prior Publication Data
US 2013/0004864 A1 Jan. 3, 2013

(30) Foreign Application Priority Data

Mar. 11, 2010 (JP) .................................. 2010-055137
Mar. 11, 2010 (JP) .................................. 2010-055160

(51) Int. Cl.
*H01M 8/06* (2006.01)
*H01M 8/10* (2006.01)
(Continued)

(52) U.S. Cl.
CPC .............. *H01M 8/0662* (2013.01); *H01M 8/06* (2013.01); *H01M 8/10* (2013.01); *H01M 8/04* (2013.01);
(Continued)

(58) Field of Classification Search
None
See application file for complete search history.

(56) References Cited

U.S. PATENT DOCUMENTS 5,200,278 A * 4/1993 Watkins et al. ............... 429/413
6,376,113 B1 * 4/2002 Edlund et al. ................. 429/410
(Continued)

FOREIGN PATENT DOCUMENTS

| JP | 02-132767 A | 5/1990 |
| JP | 11-273704 A | 10/1999 |
| JP | 2003-031247 A | 1/2003 |

(Continued)

OTHER PUBLICATIONS

Extended European Search Report issued in European Application No. 11753063.4 datd Feb. 25, 2014, 6 pgs.
International Search Report mailed Jun. 21, 2011 issued in corresponding International Application No. PCT/JP2011/001447.

*Primary Examiner* — Ula C Ruddock
*Assistant Examiner* — Tony Chuo
(74) *Attorney, Agent, or Firm* — McDermott Will & Emery LLP

(57) ABSTRACT

A fuel cell system 100 includes: a reformer 1 configured to generate a hydrogen-containing gas by using a raw material; a fuel cell 6 configured to generate electric power by using the hydrogen-containing gas; an ammonia remover 5 configured to remove ammonia from the hydrogen-containing gas generated in the reformer before the hydrogen-containing gas is supplied to the fuel cell; a fluid passage configured to allow the ammonia remover to be in communication with the atmosphere; an on-off valve 8 provided on the fluid passage and configured to allow and block the communication between the ammonia remover and the atmosphere; and a controller 80 configured to open the on-off valve in at least one of a water draining process and a water loading process of the ammonia remover.

16 Claims, 18 Drawing Sheets

(51) Int. Cl.
*H01M 8/04* (2006.01)
*C01B 3/32* (2006.01)
*C01B 3/38* (2006.01)
*C01B 3/54* (2006.01)
*C01C 1/12* (2006.01)

(52) U.S. Cl.
CPC ... *C01B 3/32* (2013.01); *C01B 3/38* (2013.01); *C01B 2203/0233* (2013.01); *C01B 2203/0244* (2013.01); *C01B 2203/025* (2013.01); *C01B 2203/0283* (2013.01); *C01B 2203/0415* (2013.01); *C01B 2203/0445* (2013.01); *C01B 2203/066* (2013.01); *C01B 2203/0827* (2013.01); *C01B 2203/16* (2013.01); *C01B 3/54* (2013.01); *C01C 1/12* (2013.01)

(56) References Cited

U.S. PATENT DOCUMENTS

| | | | |
|---|---|---|---|
| 6,815,106 B1 * | 11/2004 | Salvador et al. | 429/427 |
| 2009/0246573 A1 * | 10/2009 | Grasso et al. | 429/17 |
| 2013/0084508 A1 | 4/2013 | Yukimasa et al. | |

FOREIGN PATENT DOCUMENTS

| | | |
|---|---|---|
| JP | 2005-298249 A | 10/2005 |
| JP | 2005-327638 A | 11/2005 |
| JP | 2007-258020 A | 10/2007 |
| JP | 2007-284265 A | 11/2007 |
| JP | 2007-290942 A | 11/2007 |
| JP | 2008-202887 A | 9/2008 |
| JP | 2009-143768 A | 7/2009 |

* cited by examiner

FUEL CELL SYSTEM INCLUDING AN AMMONIA REMOVER AND METHOD OF OPERATING THE SAME

RELATED APPLICATIONS

This application is the U.S. National Phase under 35 U.S.C. §371 of International Application No. PCT/JP2011/001447, filed on Mar. 11, 2011, which in turn claims the benefit of Japanese Application No. 2010-055137, filed on Mar. 11, 2010, and Japanese Application No. 2010-055160, filed on Mar. 11, 2010, the disclosures of which Applications are incorporated by reference herein.

TECHNICAL FIELD

The present invention relates to a fuel cell system and a method of operating the fuel cell system, and more particularly to a fuel cell system including an ammonia remover configured to remove ammonia from a hydrogen-containing gas generated in a reformer and a method of operating the fuel cell system.

BACKGROUND ART

Household fuel cells and fuel cells for powering automobiles and the like generate electric power by reacting a hydrogen-containing gas with, for example, oxygen in air. The hydrogen-containing gas is generated in a reformer by using methane gas, propane gas, an alcohol, or the like, as a raw material. The hydrogen-containing gas generated in the reformer contains carbon monoxide, ammonia, etc. Such impurities are known to degrade, for example, electrodes of a fuel cell.

In order to suppress the degradation of electrodes and the like, which is caused by ammonia contained in the hydrogen-containing gas, there is a proposed solid polymer fuel cell system configured to remove ammonia from the hydrogen-containing gas by an ammonia remover which removes ammonia by causing the hydrogen-containing gas and water to come into contact with each other, or by causing moisture in the hydrogen-containing gas to be condensed and dissolving ammonia into the condensation water, thereby reducing the concentration of ammonia in the hydrogen-rich gas to 5 ppm or lower. Thereafter, the solid polymer fuel cell system supplies the hydrogen-rich gas to a solid polymer fuel cell (see Patent Literature 1, for example).

Similarly, there is a proposed reformed gas supply apparatus including an ammonia remover configured to cause a reformed gas obtained in a reformer to come into contact with water, such that ammonia contained in the reformed gas is absorbed into the water, thereby removing ammonia from the reformed gas (see Patent Literature 2, for example).

Meanwhile, there is a fuel cell system in which a passage for flowing a hydrogen-containing gas generated in a reforming device is provided with a hydrogen inlet valve 21, a hydrogen outlet valve 28, and a bypass valve 30. These valves are closed while a power generation operation is stopped, and thereby communication between the passage and the atmosphere is blocked (see Patent Literature 3, for example).

CITATION LIST

Patent Literature

PTL 1: Japanese Laid-Open Patent Application Publication No. 2003-31247
PTL 2: Japanese Laid-Open Patent Application Publication No. 2005-298249
PTL 3: Japanese Laid-Open Patent Application Publication No. 2-132767

SUMMARY OF INVENTION

Technical Problem

If a configuration as disclosed in Patent Literature 3, in which the communication between a hydrogen-containing gas passage and the atmosphere is blocked while a power generation operation is stopped, is applied to such fuel cell systems as disclosed in Patent Literatures 1 and 2 which include an ammonia remover, then the communication between the ammonia remover and the atmosphere is blocked while the power generation operation is stopped.

Conventionally, in relation to such fuel cell systems as described above where the communication between the ammonia remover and the atmosphere is blocked while the power generation operation is stopped, there has been no study on how to properly perform a water draining process of draining water from the ammonia remover (first problem).

In addition, conventionally, in relation to such fuel cell systems as described above where the communication between the ammonia remover and the atmosphere is blocked while the power generation operation is stopped, there has been no study on how to properly perform a water loading process of loading water into the ammonia remover (second problem).

The present invention has been made in order to solve at least one of the first problem and the second problem. An object of the present invention is to provide a fuel cell system configured to properly perform at least one of the water loading process and the water draining process of the ammonia remover.

Solution to Problem

In relation to a fuel cell system in which the communication between the ammonia remover and the atmosphere is blocked while a power generation operation is stopped, the inventors of the present invention conducted diligent studies regarding a method of properly draining remaining water from the inside of the ammonia remover. As a result of the diligent studies, the inventors of the present invention have obtained findings as described below.

In the case of draining water from the ammonia remover, the power generation operation of the fuel cell system is usually stopped, because during the power generation operation there is a flow of hydrogen-containing gas and it is possible that the hydrogen-containing gas leaks out to the atmosphere through a drain passage of the ammonia remover. While the power generation operation is stopped, the communication between the ammonia remover and the atmosphere is blocked as described above except at the drain passage. Therefore, merely opening a water drain valve provided at the drain passage will result in that the internal pressure of the ammonia remover decreases as the water is drained, and thereby the water becomes less easily discharged. Accordingly, draining the water is time consuming.

The inventors of the present invention also conducted diligent studies regarding loading water into the ammonia remover. As a result of the diligent studies, the inventors of the present invention have obtained findings as described below.

In the case of loading water into the ammonia remover, the power generation operation of the fuel cell system is usually stopped, because during the power generation operation there is a flow of hydrogen-containing gas and it is possible that the hydrogen-containing gas leaks out to the atmosphere through a water supply passage of the ammonia remover. While the power generation operation is stopped, the communication between the ammonia remover and the atmosphere is blocked as described above except at the water supply passage. That is, loading water into the ammonia remover through the water supply passage means that the water is supplied into a sealed container. This results in that the internal pressure of the ammonia remover increases as the amount of water stored in the ammonia remover increases. Accordingly, loading water into the ammonia remover is time consuming.

In order to solve these problems and achieve the above-described object, the inventors have conceived of the present invention.

In order to solve the above-described conventional problems, a fuel cell system according to the present invention includes: a reformer configured to generate a hydrogen-containing gas by using a raw material; a fuel cell configured to generate electric power by using the hydrogen-containing gas; an ammonia remover configured to remove ammonia from the hydrogen-containing gas generated in the reformer before the hydrogen-containing gas is supplied to the fuel cell; a fluid passage configured to allow the ammonia remover to be in communication with the atmosphere; an on-off valve provided on the fluid passage and configured to allow and block the communication between the ammonia remover and the atmosphere; and a controller configured to open the on-off valve in at least one of a water draining process and a water loading process of the ammonia remover.

ADVANTAGEOUS EFFECTS OF INVENTION

The fuel cell system according to the present invention is capable of properly performing at least one of the water loading process and the water draining process of the ammonia remover.

BRIEF DESCRIPTION OF DRAWINGS

FIG. 11A shows a case where an evaporating part is configured to evaporate water and to allow a raw material to flow through; and FIG. 11B shows a case where steam is generated at the evaporating part and thereafter the raw material is mixed into the steam at a downstream position.

DESCRIPTION OF EMBODIMENTS

Figure 1:
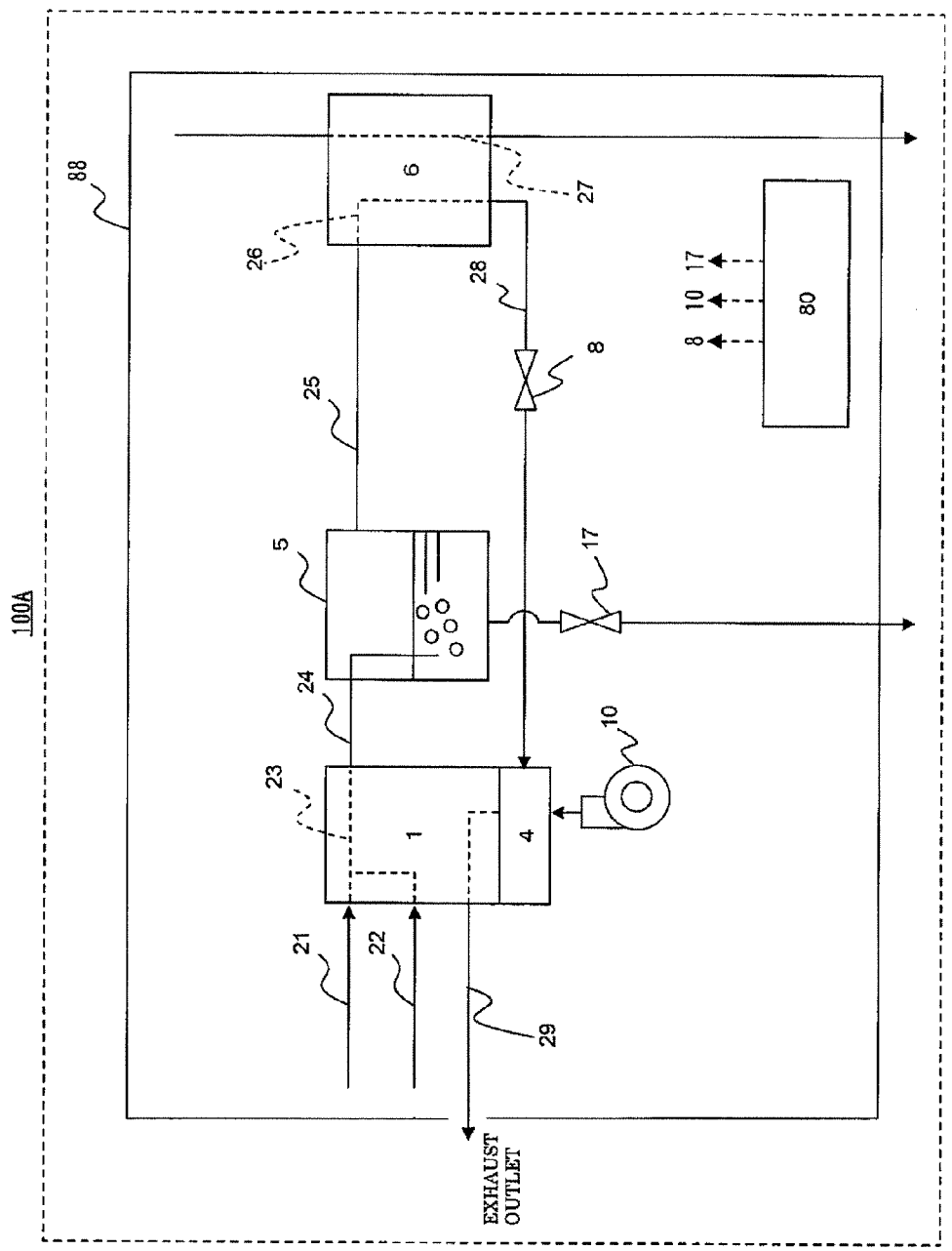
FIG. 1 is a schematic diagram showing an example of a schematic configuration of a fuel cell system according to Embodiment 1.

Hereinafter, embodiments of the present invention are described with reference to the drawings.

Embodiment 1

A fuel cell system according to Embodiment 1 includes: a reformer configured to generate a hydrogen-containing gas by using a raw material; a fuel cell configured to generate electric power by using the hydrogen-containing gas; an ammonia remover configured to remove ammonia from the hydrogen-containing gas generated in the reformer before the hydrogen-containing gas is supplied to the fuel cell; a fluid passage configured to allow the ammonia remover to be in communication with the atmosphere; an on-off valve provided on the fluid passage and configured to allow and block the communication between the ammonia remover and the atmosphere; and a controller configured to open the on-off valve in a water draining process of the ammonia remover.

According to the above configuration, the water draining process of the ammonia remover can be properly performed.

The ammonia remover herein may be configured in any manner, so long as the ammonia remover is configured to remove water from the hydrogen-containing gas by dissolving ammonia into water. Specific examples of the manner of removing ammonia include: remove ammonia by causing the ammonia and water to come into contact with each other; and cause moisture in the hydrogen-containing gas to be condensed and dissolve ammonia into the condensation water, thereby removing the ammonia.

In the fuel cell system according to Embodiment 1, the fluid passage may be a passage configured to discharge a fluid different from the hydrogen-containing gas to the atmosphere.

In the fuel cell system according to Embodiment 1, the passage configured to discharge a fluid different from the hydrogen-containing gas to the atmosphere may be a passage extending through a combustor configured to combust the hydrogen-containing gas that is sent out from the reformer.

The fuel cell system according to Embodiment 1 may further include: a combustor configured to combust the hydrogen-containing gas that is sent out from the reformer; and an air supply device configured to supply combustion air to the combustor. In the fuel cell system according to Embodiment 1, the fluid passage may be a passage downstream from the ammonia remover, and extend through the combustor, and the controller may be configured to operate the air supply device when the on-off valve is open.

According to the above configuration, when the air supply device is operated, the pressure in a passage that connects the ammonia remover and the combustor increases. As a result, water remaining within the ammonia remover can be drained more efficiently.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

A method of operating a fuel cell system, according to Embodiment 1, includes: removing, by an ammonia remover, ammonia from a hydrogen-containing gas generated in a reformer before the hydrogen-containing gas is supplied to a fuel cell; performing a water draining process of draining water from inside of the ammonia remover to outside of the fuel cell system; and in the water draining process, opening an on-off valve provided on a fluid passage configured to allow the ammonia remover to be in communication with the atmosphere, the on-off valve being configured to allow and block the communication between the ammonia remover and the atmosphere.

FIG. 1 is a schematic diagram showing an example of a schematic configuration of the fuel cell system according to Embodiment 1.

A fuel cell system 100A according to the present embodiment includes: a reformer 1; a combustor 4; an ammonia remover 5; a fuel cell 6; a first on-off valve 8; a combustion air supply device 10; a first water passage 21; a raw material passage 22; a second fuel gas passage 25; an anode-side passage 26; a cathode-side passage 27; an exhaust fuel gas passage 28; a flue gas passage 29; a casing 88; and a controller 80.

The reformer 1 generates a hydrogen-containing gas by using a raw material. The reforming reaction that occurs in the reformer 1 may be of any type. Examples of the reforming reaction include a steam reforming reaction, an autothermal reaction, and a partial reforming reaction. In the present embodiment, the reformer 1 includes a reforming catalyst in a passage 23, for example, and by means of the reforming catalyst, the reformer 1 causes a steam reforming reaction of the raw material, thereby generating a hydrogen-containing gas. The reformer 1 herein includes an evaporating part which is not shown in FIG. 1. Steam is generated in the evaporating part. The raw material contains an organic compound, the constituent elements of which are at least carbon and hydrogen. For example, a hydrocarbon-containing gas such as natural gas, LNG, LPG, or city gas, or alternatively, an alcohol or the like is used as the raw material.

The combustor 4 combusts the hydrogen-containing gas that is sent out from the reformer 1.

The ammonia remover 5 removes ammonia from the hydrogen-containing gas generated in the reformer 1 before the hydrogen-containing gas is supplied to the fuel cell 6.

In the present embodiment, the ammonia remover 5 is configured to remove ammonia from the hydrogen-containing gas by causing the ammonia and water to come into contact with each other. Specifically, the ammonia remover 5 includes a water container, and is configured to guide the hydrogen-containing gas into water stored in the water container, such that the hydrogen-containing gas comes into contact with the water. As a result, ammonia gas contained in the hydrogen-containing gas is dissolved into the water and thereby removed from the hydrogen-containing gas. In this manner, catalyst poisoning in the fuel cell 6 that is caused by ammonia is reduced. As a result, the life of the fuel cell system is improved.

The water container of the ammonia remover 5 is provided with a drain passage and a second on-off valve 17 configured to open and close the drain passage. Water remaining in the water container of the ammonia remover 5 is discharged (discarded) to the outside of the fuel cell system 100A by opening the second on-off valve 17. The second on-off valve 17 may be directly installed on the ammonia remover 5.

The fuel cell 6 generates electric power by reacting the hydrogen-containing gas with an oxidizing gas. The fuel cell 6 may be of any type. Examples of the fuel cell 6 include a polymer electrolyte fuel cell, a solid oxide fuel cell, a phosphoric-acid fuel cell, and a molten carbonate fuel cell.

The exhaust fuel gas passage 28 is provided with the first on-off valve 8 which is configured to open and close the exhaust fuel gas passage 28. The combustion air supply device 10 supplies combustion air to the combustor 4. For example, a blower, fan, or the like is used as the combustion air supply device 10.

The first water passage 21 is a passage through which water flows, the water serving as the source of steam used in the steam reforming reaction in the reformer 1. The first water passage 21 is connected to the evaporating part (not shown). The raw material passage 22 is a passage through which the raw material supplied to the reformer 1 flows.

The second fuel gas passage 25 connects the ammonia remover 5 and the inlet of the anode-side passage 26 of the fuel cell 6. The anode-side passage 26 is a passage through which the hydrogen-containing gas supplied to the anode of the fuel cell 6 flows. The cathode-side passage 27 is a passage through which the oxidizing gas supplied to the cathode of the fuel cell 6 flows. The exhaust fuel gas passage 28 connects the fuel cell 6 and the combustor 4. The flue gas passage 29 is a passage through which a flue gas generated in the combustor 4 flows.

Here, the second fuel gas passage 25, the anode-side passage 26, the exhaust fuel gas passage 28, the combustor 4, and the flue gas passage 29 form a fluid passage that allows the ammonia remover 5 to be in communication with the atmosphere. Accordingly, the first on-off valve 8 serves as an on-off valve provided on the fluid passage and configured to allow and block the communication between the ammonia remover 5 and the atmosphere. Since a gas flowing through the fluid passage is discharged to the atmosphere as a flue gas, the fluid passage is an example of the passage configured to discharge a fluid different from the hydrogen-containing gas to the atmosphere.

The controller 80 may be any device, so long as the controller 80 has a control function. The controller 80 includes an arithmetic processing unit and a storage unit which stores control programs. Examples of the controller 80 include a microcontroller and a PLC (Programmable Logic Controller). Examples of the arithmetic processing unit include an MPU and CPU. The storage unit is a memory, for example. The controller 80 may be configured as a single controller performing centralized control, or may be configured as a group of multiple controllers performing distributed control in cooperation with each other.

The casing 88 accommodates component devices of the fuel cell system which includes at least the reformer 1, the fuel cell 6, and the ammonia remover 5. In the present embodiment, the casing 88 accommodates these devices.

Moreover, the fuel cell system 100A according to the present embodiment includes a first water supply device and a raw material supply device which are not shown.

The first water supply device has a function of blocking a flow of the water when stopping operating and a function of adjusting the flow rate of the water. Here, "blocking a flow of the water when stopping operating" includes not only a case where a timing of stopping the operation of the first water supply device and a timing of blocking a flow of the water are concurrent, but also a case where these timings are such that one of the timings is prior or subsequent to the other timing. The function of blocking a flow of the water can be realized by, for example, an on-off valve, a pump having a function of blocking a flow of the water when stopping operating, or a flow rate adjusting valve. The function of adjusting the flow rate of the water can be realized by, for example, a pump or a flow rate adjusting valve. In the present embodiment, the first water supply device is configured so as to include a pump and an on-off valve. The pump realizes the first water supply device's function of adjusting the flow rate of the water, and the on-off valve realizes the first water supply device's function of blocking a flow of the water when stopping operating.

The raw material supply device has a function of blocking a flow of the raw material when stopping operating and a function of adjusting the flow rate of the raw material. Here, "blocking a flow of the raw material when stopping operating" includes not only a case where a timing of stopping the operation of the raw material supply device and a timing of blocking a flow of the raw material are concurrent, but also a case where these timings are such that one of the timings is prior or subsequent to the other timing. The function of blocking a flow of the raw material can be realized by, for example, an on-off valve, a pump having a function of blocking a flow of the raw material when stopping operating, or a flow rate adjusting valve. The function of adjusting the flow rate of the raw material can be realized by, for example, a pump or a flow rate adjusting valve. In the present embodiment, the raw material supply device is configured so as to include a pump and an on-off valve. The pump realizes the raw material supply device's function of adjusting the flow rate of the raw material, and the on-off valve realizes the raw material supply device's function of blocking a flow of the raw material when stopping operating.

The fuel cell system 100A performs a power generation operation in such a manner that the fuel cell generates electric power by using the hydrogen-containing gas from which ammonia has been removed in the ammonia remover 5 and using air supplied from an oxidizing gas supply device which is not shown. Since the details of such a power generation operation are well known, a detailed description thereof will be omitted.

The water draining process of the ammonia remover is performed by opening the second on-off valve 17 when the power generation operation of the fuel cell system 100A is in a stopped state. In the water draining process, the first on-off valve 8 is opened, and thereby the ammonia remover 5 becomes open to the atmosphere via the fluid passage that allows the ammonia remover 5 to be in communication with the atmosphere. It should be noted that while the power generation operation is stopped, the first water supply device and the raw material supply device are stopped from operating, and the first water passage 21 and the raw material passage 22 are closed.

It is preferred that the first on-off valve 8 is automatically opened through control by the controller 80. It is also preferred that the second on-off valve 17 is automatically opened through control by the controller 80. Alternatively, the fuel cell system 100A may be configured such that at least one of the first on-off valve 8 and the second on-off valve 17 is manually opened by an operator. In this case, it is preferred that the on-off valve(s) to be manually opened by the operator is provided outside of the casing 88. Then, out of the first on-off valve 8 and the second on-off valve 17, an on-off valve that is not manually opened by the operator is automatically opened through control by the controller 80.

According to the above configuration, water within the ammonia remover is properly discharged in the water draining process of the ammonia remover.

It should be noted that, in the water draining process, the controller 80 may operate the combustion air supply device 10. Accordingly, when the air supply device is operated, the pressure in a passage that connects the ammonia remover and the combustor increases. As a result, water remaining within the ammonia remover can be drained more efficiently.

[Variation]

A fuel cell system according to a variation of Embodiment 1 is such that, in the fuel cell system according to Embodiment 1, the ammonia remover is configured to remove ammonia from the hydrogen-containing gas by causing water falling from the upper part of the ammonia remover and the hydrogen-containing gas to come into contact with each other.

Figure 2:
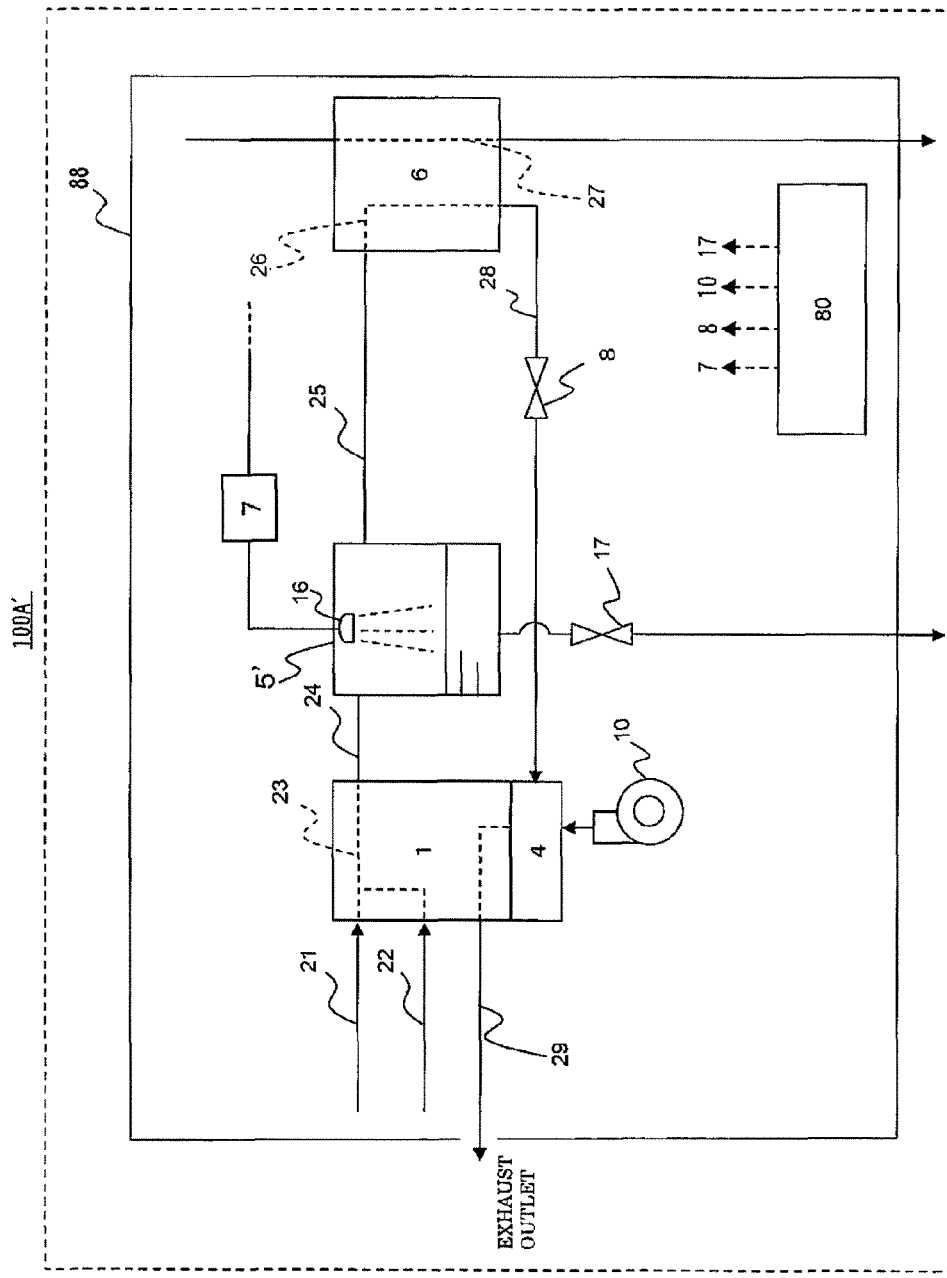
FIG. 2 is a schematic diagram showing an example of a schematic configuration of a fuel cell system according to a variation of Embodiment 1.

FIG. 2 is a schematic diagram showing an example of a schematic configuration of the fuel cell system according to the variation of Embodiment 1.

A fuel cell system 100A' according to the variation of Embodiment 1 is configured in the same manner as the fuel cell system 100A except that the ammonia remover 5 is replaced with an ammonia remover 5'. Therefore, common components between the fuel cell system 100A' and the fuel cell system 100A are denoted by the same reference signs and names, and a description of such components will be omitted.

The ammonia remover 5' includes a water sprayer 16 connected to a second water supply device 7. The second water supply device 7 is supplied with water from a water source (not shown). For example, a water tank, tap water piping, or the like can be used as the water source. The water sprayer 16 sprays the water in the internal space of the ammonia remover 5', through which space the hydrogen-containing gas flows, thereby causing the hydrogen-containing gas and the water to come into contact with each other. In this manner, ammonia contained in the hydrogen-containing gas is dissolved into the water, and thereby removed from the hydrogen-containing gas. The water sprayed within the ammonia remover 5' remains in the ammonia remover 5'. The water container of the ammonia remover 5' is provided with a drain passage and the second on-off valve 17 configured to open and close the drain passage. The water remaining in the ammonia remover 5 is discharged (discarded) to the outside of the fuel cell system 100A' by opening the second on-off valve 17. The second on-off valve 17 may be directly installed on the ammonia remover 5.

The variation of Embodiment 1 provides the same advantageous effects as those provided by Embodiment 1. The same modifications as those made to Embodiment 1 can be made to the variation of Embodiment 1.

The ammonia remover is not limited to the above-described example but may be configured in any manner, so long as the ammonia remover is configured to cause water falling from the upper part of the ammonia remover and the hydrogen-containing gas to come into contact with each other, thereby removing ammonia from the hydrogen-containing gas. For example, the ammonia remover may be configured by using Raschig rings. The ammonia remover with this configuration supplies water from above the Raschig rings, such that the water that falls through the Raschig rings and the hydrogen-containing gas that rises from below the Raschig rings come into gas-liquid contact with each other, thereby removing ammonia from the hydrogen-containing gas.

Embodiment 2

A fuel cell system according to Embodiment 2 includes: a reformer configured to generate a hydrogen-containing gas by using a raw material; a fuel cell configured to generate electric power by using the hydrogen-containing gas; an ammonia remover configured to remove ammonia from the hydrogen-containing gas generated in the reformer before the hydrogen-containing gas is supplied to the fuel cell; a fluid passage configured to allow the ammonia remover to be in communication with the atmosphere; an on-off valve provided on the fluid passage and configured to allow and block the communication between the ammonia remover and the atmosphere; and a controller configured to open the on-off valve in a water loading process of the ammonia remover.

According to the above configuration, the water loading process of the ammonia remover can be properly performed.

The ammonia remover herein may be configured in any manner, so long as the ammonia remover is configured to remove water from the hydrogen-containing gas by dissolving ammonia into water. Specific examples of the manner of removing ammonia include: remove ammonia by causing the ammonia and water to come into contact with each other; and cause moisture in the hydrogen-containing gas to be condensed and dissolve ammonia into the condensation water, thereby removing the ammonia.

In the fuel cell system according to Embodiment 2, the fluid passage may be a passage configured to discharge a fluid different from the hydrogen-containing gas to the atmosphere.

In the fuel cell system according to Embodiment 2, the passage configured to discharge a fluid different from the hydrogen-containing gas to the atmosphere may be a passage extending through a combustor configured to combust the hydrogen-containing gas that is sent out from the reformer.

A method of operating a fuel cell system, according to Embodiment 2, includes: removing, by an ammonia remover, ammonia from a hydrogen-containing gas generated in a reformer before the hydrogen-containing gas is supplied to a fuel cell; performing a water loading process of loading water into the ammonia remover; and in the water draining process, opening an on-off valve provided on a fluid passage configured to allow the ammonia remover to be in communication with the atmosphere, the on-off valve being configured to allow and block the communication between the ammonia remover and the atmosphere.

Other than the above features, the fuel cell system according to the present embodiment may be configured in the same manner as at least one of the fuel cell systems according to Embodiment 1 and the variation of Embodiment 1.

<Configuration>

Figure 3:
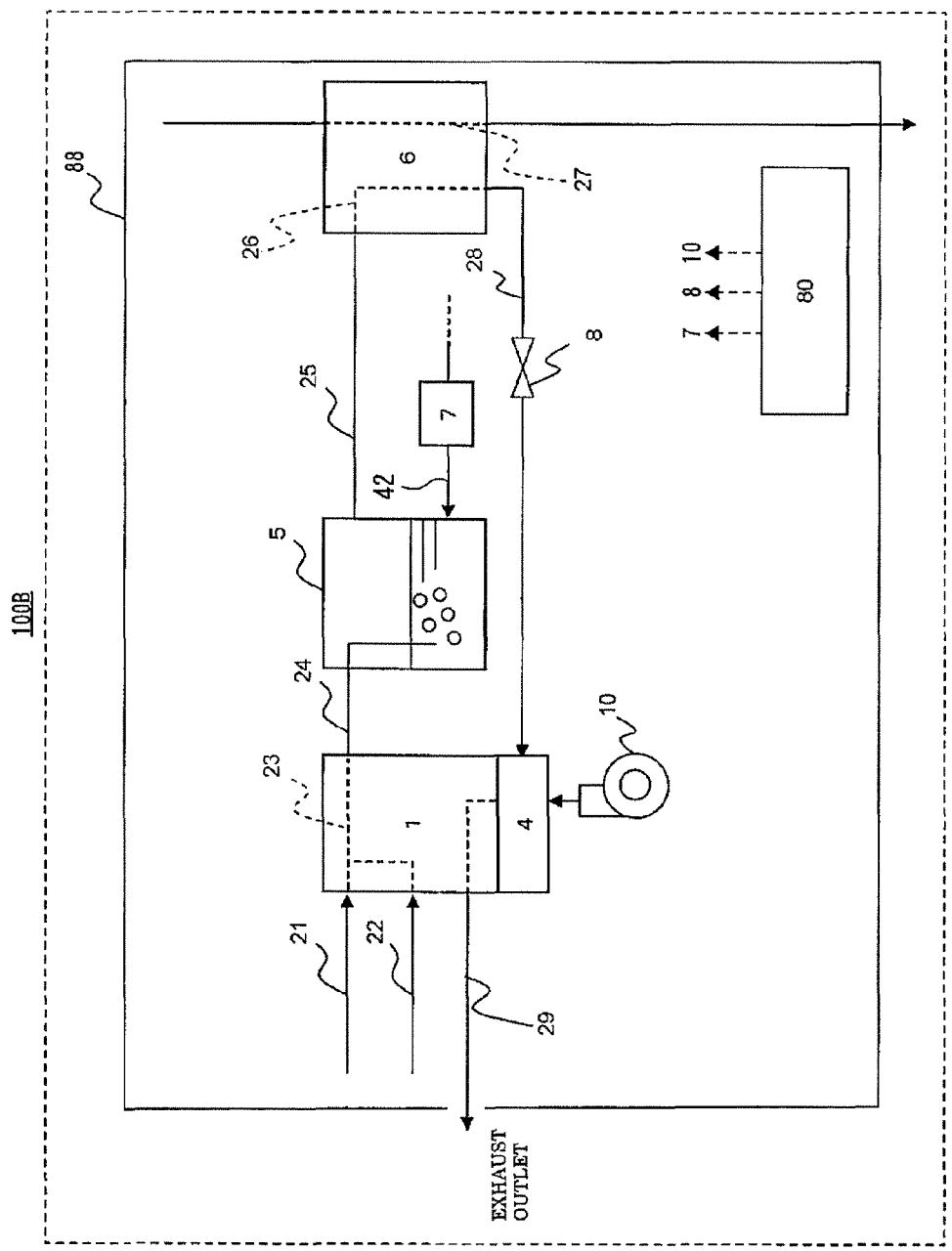
FIG. 3 is a schematic diagram showing an example of a schematic configuration of a fuel cell system according to Embodiment 2.

FIG. 3 is a schematic diagram showing an example of a schematic configuration of the fuel cell system according to Embodiment 2.

A fuel cell system 100B according to the present embodiment includes: the reformer 1; the combustor 4; the ammonia remover 5; the fuel cell 6; the second water supply device 7; the first on-off valve 8; the combustion air supply device 10; the first water passage 21; the raw material passage 22; the second fuel gas passage 25; the anode-side passage 26; the cathode-side passage 27; the exhaust fuel gas passage 28; the flue gas passage 29; a water supply passage 42; the casing 88; and the controller 80.

Since the reformer 1, the combustor 4, the ammonia remover 5, the fuel cell 6, the first on-off valve 8, the combustion air supply device 10, the first water passage 21, the raw material passage 22, the second fuel gas passage 25, the anode-side passage 26, the cathode-side passage 27, the exhaust fuel gas passage 28, the flue gas passage 29, the casing 88, and the controller 80 are the same as those of Embodiment 1, a detailed description of these components will be omitted.

The second water supply device 7 supplies water to the ammonia remover 5. For example, a pump, a flow rate adjusting valve, or an on-off valve is used as the second water supply device 7. The water supply passage 42 is a passage through which the water supplied to the ammonia remover 8 flows.

The fuel cell system 100B according to the present embodiment further includes a first water supply device, a raw material supply device, a drain passage, a drain valve, an oxidizing gas supply device, and a second on-off valve, which are not shown.

Since the first water supply device, the raw material supply device, the drain passage, the drain valve, the oxidizing gas supply device, and the second on-off valve are the same as those of Embodiment 1, a detailed description of these components will be omitted.

The fuel cell system 100B performs a power generation operation in such a manner that the fuel cell generates electric power by using the hydrogen-containing gas from which ammonia has been removed in the ammonia remover 5 and using air supplied from the oxidizing gas supply device. Since the details of such a power generation operation are well known, a detailed description thereof will be omitted.

<Operations>

Hereinafter, the water loading process of the ammonia remover that is performed by the fuel cell system 100B with the above-described configuration is described. Operations described below are performed through control by the controller 80.

Figure 4:
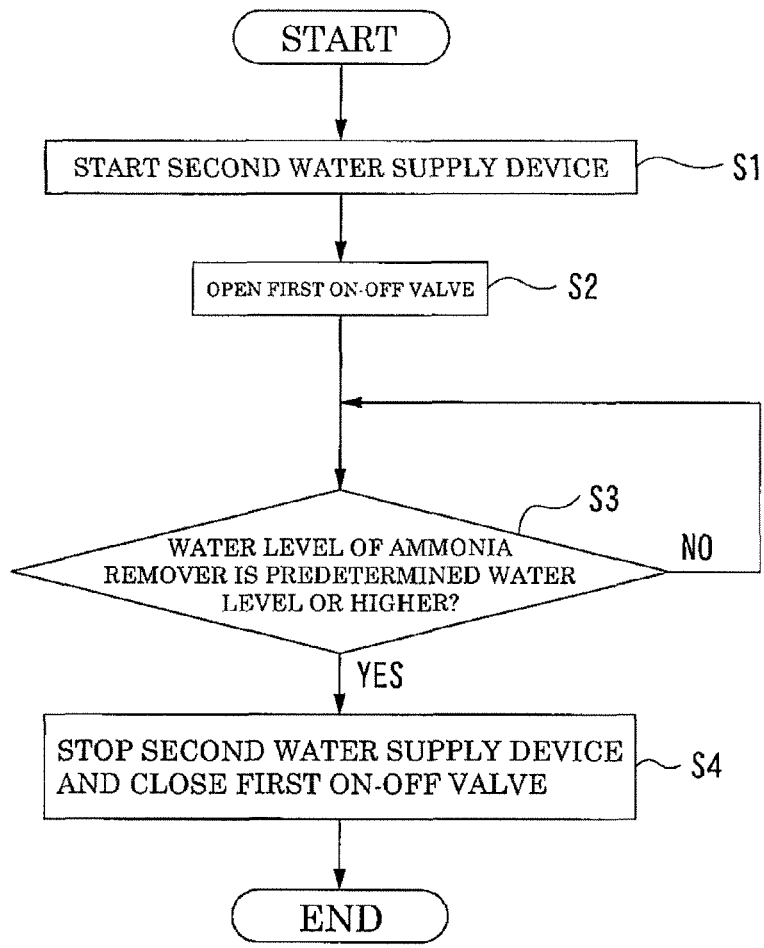
FIG. 4 is a flowchart showing a water loading process of an ammonia remover in the fuel cell system shown in FIG. 3.

Described below is the water loading process of the ammonia remover 5, which is the feature of the present embodiment. FIG. 4 is a flowchart showing the water loading process of the ammonia remover in the fuel cell system shown in FIG. 3.

The water loading process is performed, for example, at the installation of the fuel cell system 100B or when maintenance work is performed on the fuel cell system 100B. That is, the water loading process is performed when the power generation operation of the fuel cell system 100B is in a stopped state. At the time, the second on-off valve of the drain passage of the ammonia remover 5 is in a closed state.

In such a state, first, the controller 80 starts the second water supply device 7 (step S1). As a result, second water is supplied to the water container of the ammonia remover 5.

Next, the controller 80 opens the first on-off valve 8 (step S2). As a result, a gas in a volume that corresponds to the volume of the second water supplied to the water container of the ammonia remover 5 flows into the combustor 4, and thereafter, the gas is released to the atmosphere through the flue gas passage 29.

It should be noted that the above-described steps S1 and S2 may be performed in a reverse order, or may be performed at the same time.

Next, the controller 80 waits for the water level of the water container of the ammonia remover 5 to become a predetermined water level or higher (NO in step S3). When the water level of the water container has become the predetermined water level or higher (YES in step S3), the controller 80 stops the second water supply device 7 and closes the first on-off valve 8 (step S4). In this manner, the water loading process of the ammonia remover 5 ends.

As described above, according to the fuel cell system 100B, water is properly supplied to the inside of the ammonia remover in the water loading process of the ammonia remover.

It should be noted that the fuel cell system 100B may be configured such that the operations of opening and closing the first on-off valve 8 in the above-described water loading process are performed not through the control by the controller 80 but through manual operations by an operator. In this case, the first on-off valve 8 may be provided outside of the casing 88.

[Variation 1]

A fuel cell system according to Variation 1 of Embodiment 2 may further include: a combustor configured to combust the hydrogen-containing gas that is sent out from the reformer; and an air supply device configured to supply combustion air to the combustor. In the fuel cell system according to Variation 1, the fluid passage may be a passage downstream from the ammonia remover and extend through the combustor, and the controller may be configured to operate the air supply device when the on-off valve is open.

According to the above configuration, even if a gas that remains in the fluid passage at a position upstream from the combustor contains a combustible gas, the gas is diluted by the combustion air and discharged. This improves safety as compared to a case where the air supply device is not operated when the water loading is performed.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

Other than the above features, the fuel cell system according to Variation 1 may be configured in the same manner as at least one of the fuel cell systems according to Embodiment 1, Embodiment 2, and the variation of Embodiment 1.

Figure 5:
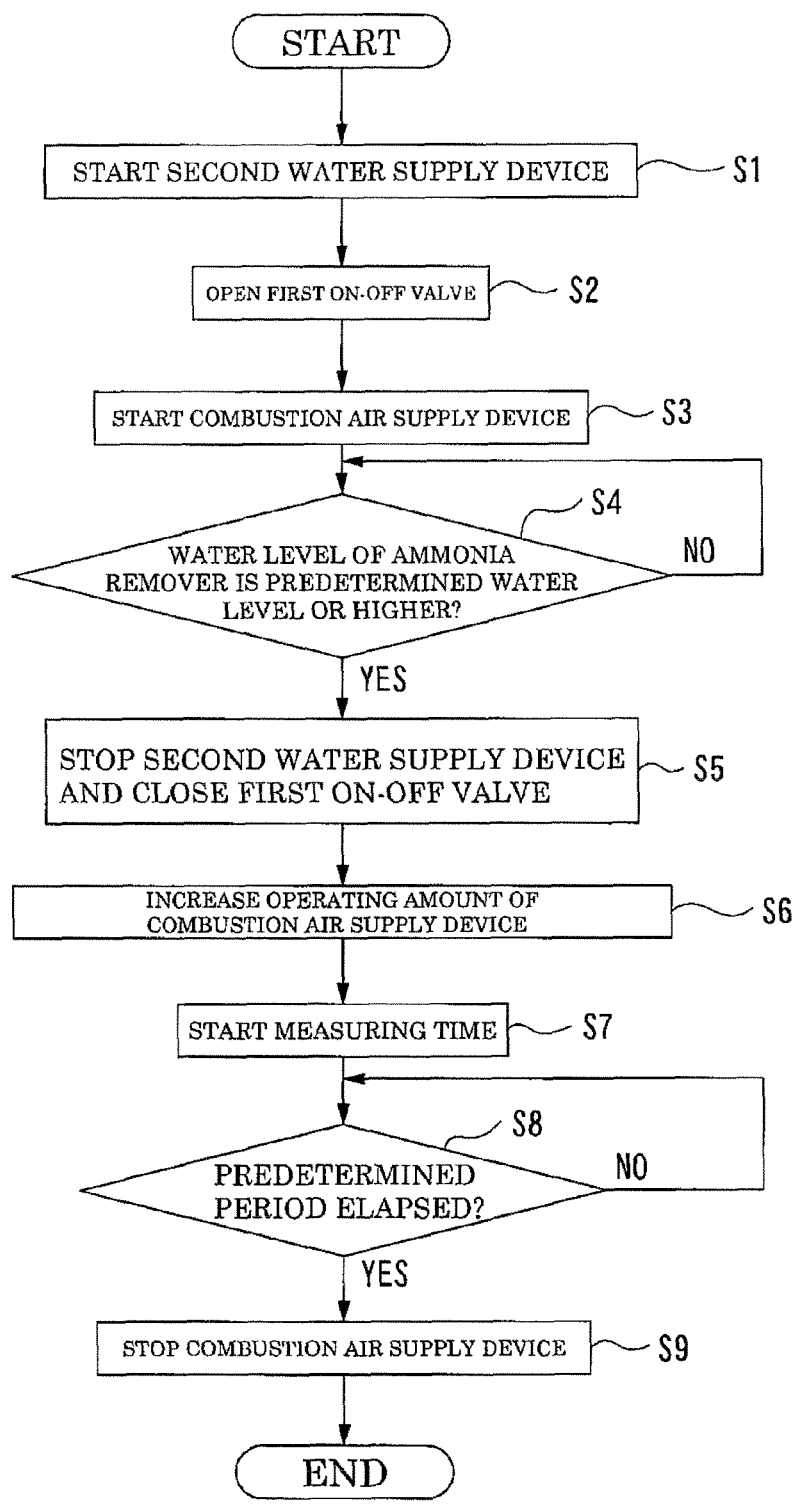
FIG. 5 is a flowchart showing a water loading process of an ammonia remover in a fuel cell system according to Variation 1 of Embodiment 2.

FIG. 5 is a flowchart showing the water loading process of the ammonia remover in the fuel cell system according to Variation 1 of Embodiment 2.

In Variation 1, a residual gas in the fluid passage that flows into the combustor 4 by being pushed by water supplied to the ammonia remover 5 in the water loading process is diluted.

When the fuel cell system 100B is in a stopped state as previously described above, first, the controller 80 starts the second water supply device 7 (step S1). As a result, the second water is supplied to the water container of the ammonia remover 5.

Next, the controller 80 opens the first on-off valve 8 (step S2). As a result, a gas in a volume that corresponds to the volume of the second water supplied to the water container of the ammonia remover 5 flows into the combustor 4. Steps S1 and S2 are the same as those of Embodiment 2.

Next, the controller 80 starts the combustion air supply device 10 (step S3). As a result, the gas that has flowed into the combustor 4 is diluted by the combustion air and released to the atmosphere. Thus, safety is improved as compared to a case where the combustion air supply device 10 is not operated.

Safety is improved as compared to a case where the combustion air supply device 10 is not operated, because even if a gas that remains in the fluid passage at a position between the ammonia remover 5 and the combustor 4 prior to performing the water loading process of the ammonia remover 5 contains a combustible gas, the gas is diluted and discharged as described above.

Here, if the flow rate of the air supplied to the combustor 4 by the combustion air supply device 10 is excessively high, then the back pressure (the pressure in the combustor 4) increases due to increased pressure loss in the flue gas passage 29. As a result, the inflow of the second water into the water container of the ammonia remover 5 is suppressed. Therefore, the operating amount of the combustion air supply device 10 in a case where water is being supplied to the water container of the ammonia remover 5 with the first on-off valve 8 opened is controlled to be less than the operating amount of the combustion air supply device 10 in a case where the fuel cell system 100B is generating electric power. To be more specific, the operating amount of the combustion air supply device 10 in a case where water is being supplied to the water container of the ammonia remover 5 with the first on-off valve 8 opened is set to be less than the operating amount of the combustion air supply device 10 in a case where the fuel cell system 100B is generating electric power with minimum output. Preferably, the operating amount of the combustion air supply device 10 is set to the lower limit value within an operating amount range (the operating amount range specific to the combustion air supply device 10), within which range the combustion air supply device 10 can supply air in a stable manner (i.e., the manufacturer's guaranteed lower limit operating amount for the combustion air supply device 10).

It should be noted that the above-described steps S1 to S3 may be performed in any order, or may be performed partially or entirely at the same time.

Next, the controller 80 waits for the water level of the water container of the ammonia remover 5 to become a predetermined water level or higher (NO in step S4). When the water level of the water container has become the predetermined water level or higher (YES in step S4), the controller 80 stops the second water supply device 7 and closes the first on-off valve 8 (step S5). In this manner, the water loading process of the ammonia remover 5 ends.

Subsequently, the controller 80 continues to operate the combustion air supply device 10 after the water supply to the ammonia remover 5 is stopped, and increases the operating amount of the combustion air supply device 10 (step S6). As a result, as compared to a case where the operating amount is not increased, a gas remaining in the combustor 4 can be discharged more speedily and purging the inside of the combustor 4 with the combustion air can be completed at an earlier stage. Here, the operating amount of the combustion air supply device 10 may be increased to be greater than the operating amount of the combustion air supply device 10 in a case where the fuel cell 6 is generating electric power with maximum output.

Next, the controller 80 starts measuring the time after the water loading process of loading water into the ammonia remover 5 has ended (step S7). When a predetermined period of time has elapsed (YES in step S9), the controller 80 stops the combustion air supply device 10 from operating (step S9). In this manner, the water loading process of the ammonia remover 5 and other accompanying processes are completed.

The predetermined period of time is determined based on an experiment, simulation, and calculation, for example.

According to Variation 1, a confined gas is diluted and released to the atmosphere. Therefore, safety is more improved as compared to a case where the combustion air supply device is not operated during the water loading process.

[Variation 2]

A fuel cell system according to Variation 2 of Embodiment 2 is such that, in the fuel cell system according to Embodiment 2, the ammonia remover which removes ammonia by causing the ammonia and water to come into contact with each other is configured, as one example, such that the ammonia remover removes ammonia from the hydrogen-containing gas by causing water falling from the upper part of the ammonia remover and the hydrogen-containing gas to come into contact with each other.

Other than the above feature, the fuel cell system according to Variation 2 may be configured in the same manner as at least one of the fuel cell systems according to Embodiment 1, Embodiment 2, and the variations of these embodiments.

Figure 6:
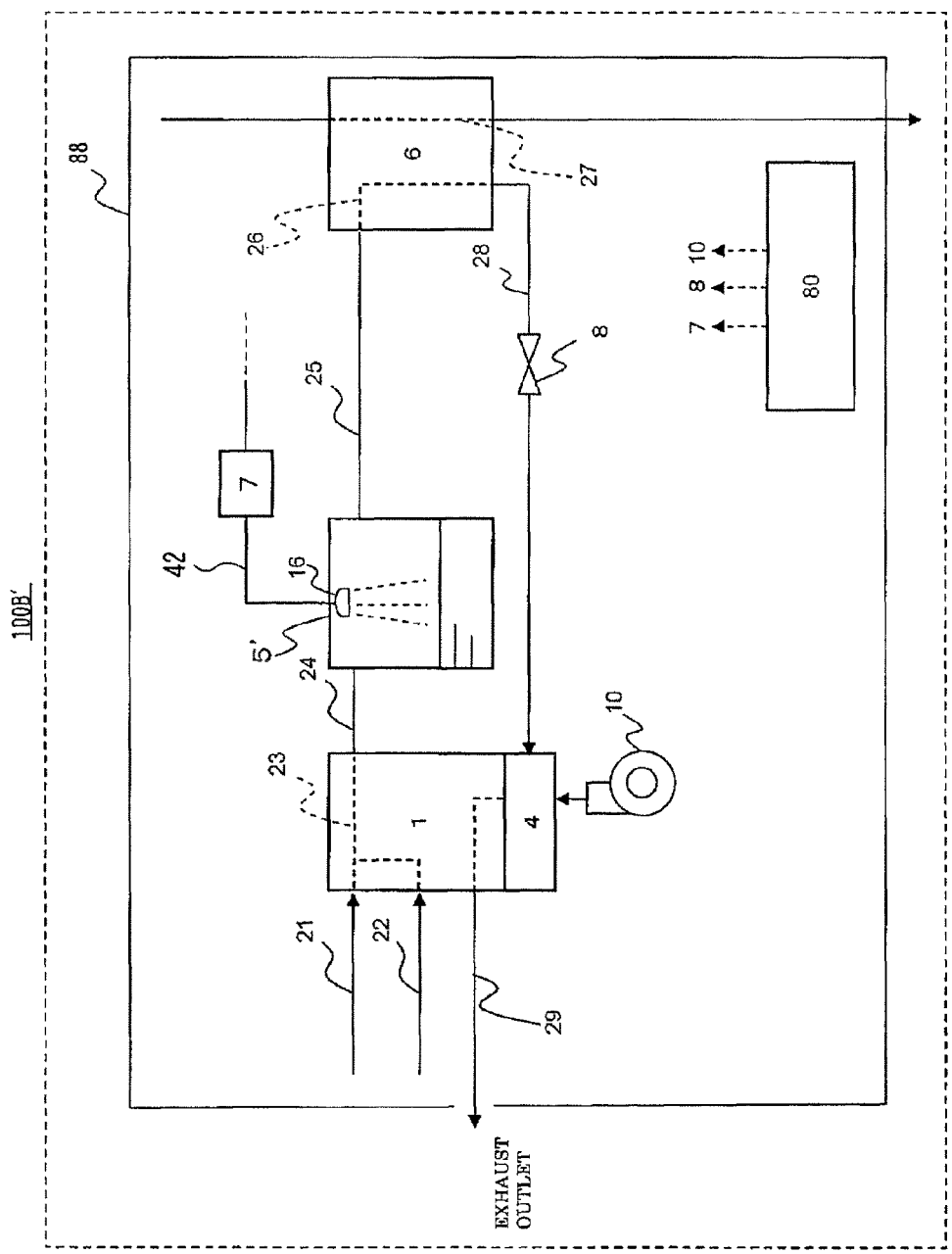
FIG. 6 is a schematic diagram showing an example of a schematic configuration of a fuel cell system according to Variation 2 of Embodiment 2.

FIG. 6 is a schematic diagram showing an example of a schematic configuration of the fuel cell system according to Variation 2 of Embodiment 2.

A fuel cell system 100B' according to Variation 2 is configured in the same manner as the fuel cell system 100B except that the ammonia remover 5 is replaced with the ammonia remover 5'. Therefore, common components between the fuel cell system 100B' and the fuel cell system 100B are denoted by the same reference signs and names, and a description of such components will be omitted.

The ammonia remover 5' includes the water sprayer 16 which is connected to the second water supply device 7 via the water supply passage 42. The second water supply device 7 is supplied with the second water from the water source (not shown). The water sprayer 16 sprays the second water in the internal space of the ammonia remover 5', through which space the hydrogen-containing gas flows, thereby causing the hydrogen-containing gas and the second water to come into contact with each other. In this manner, ammonia contained in the hydrogen-containing gas is dissolved into the second water, and thereby removed from the hydrogen-containing gas. The water sprayed within the ammonia remover 5' remains in the ammonia remover 5'. The water container of the ammonia remover 5' is provided with the drain passage and the second on-off valve configured to open and close the drain passage.

Variation 2 provides the same advantageous effects as those provided by Embodiment 2. The same modifications as those made to Embodiment 2 can be made to Variation 2.

[Variation 3]

A fuel cell system according to Variation 3 of Embodiment 2 is another example where the ammonia remover is configured to remove ammonia from the hydrogen-containing gas by causing water falling from the upper part of the ammonia remover and the hydrogen-containing gas to come into contact with each other.

Specifically, the fuel cell system is configured to remove water stored in the ammonia remover and to recycle the water as the water falling from the upper part of the ammonia remover.

Other than the above feature, the fuel cell system according to Variation 3 may be configured in the same manner as at least one of the fuel cell systems according to Embodiment 1, Embodiment 2, and the variations of these embodiments.

Figure 7:
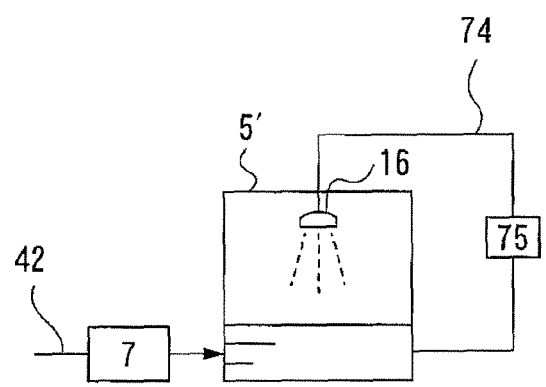
FIG. 7 is a schematic diagram showing an example of a schematic configuration of an ammonia remover in a fuel cell system according to Variation 3 of Embodiment 2.

FIG. 7 is a schematic diagram showing an example of a schematic configuration of the ammonia remover in the fuel cell system according to Variation 3 of Embodiment 2.

As shown in FIG. 7, in the ammonia remover 5' according to Variation 3, the water-storing part of the water container and the water sprayer 16 are connected by a water-circulation passage 74. The water-circulation passage 74 is provided with a water supply device 75. As with Embodiment 2, the downstream end of the water supply passage 42 is connected to the water-storing part of the water container, and the water supply passage 42 is provided with the second water supply device 7.

Other than the above features, the configuration according to Variation 3 may be the same as the configuration according to Embodiment 2.

Variation 3 provides the same advantageous effects as those provided by Embodiment 2. The same modifications as those made to Embodiment 2 can be made to Variation 3.

It should be noted that the specific configuration of the ammonia remover is not limited to those described above in Variation 2 and Variation 3 but may be any configuration, so long as the ammonia remover is configured to cause water falling from the upper part of the ammonia remover and the hydrogen-containing gas to come into contact with each other, thereby removing ammonia from the hydrogen-containing gas. For example, the ammonia remover may be configured by using Raschig rings. The ammonia remover with this configuration supplies water from above the Raschig rings, such that the water that falls through the Raschig rings and the hydrogen-containing gas that rises from below the Raschig rings come into gas-liquid contact with each other, thereby removing ammonia from the hydrogen-containing gas.

The present embodiment and the variations thereof may be implemented in combination with Embodiment 1. As one specific example, the controller 80 may open the first on-off valve 8 in both of the water draining process and the water loading process of the ammonia remover 5.

Embodiment 3

A fuel cell system according to Embodiment 3 is such that any one of the fuel cell systems according to Embodiment 1 and the variation thereof further includes a bypass passage configured to supply the hydrogen-containing gas generated in the reformer to the combustor in a manner to bypass the fuel cell. The fluid passage is configured to extend through the bypass passage.

Other than the above features, the fuel cell system according to the present embodiment may be configured in the same manner as at least one of the fuel cell systems according to Embodiment 1, Embodiment 2, and the variations of these embodiments.

Figure 8:
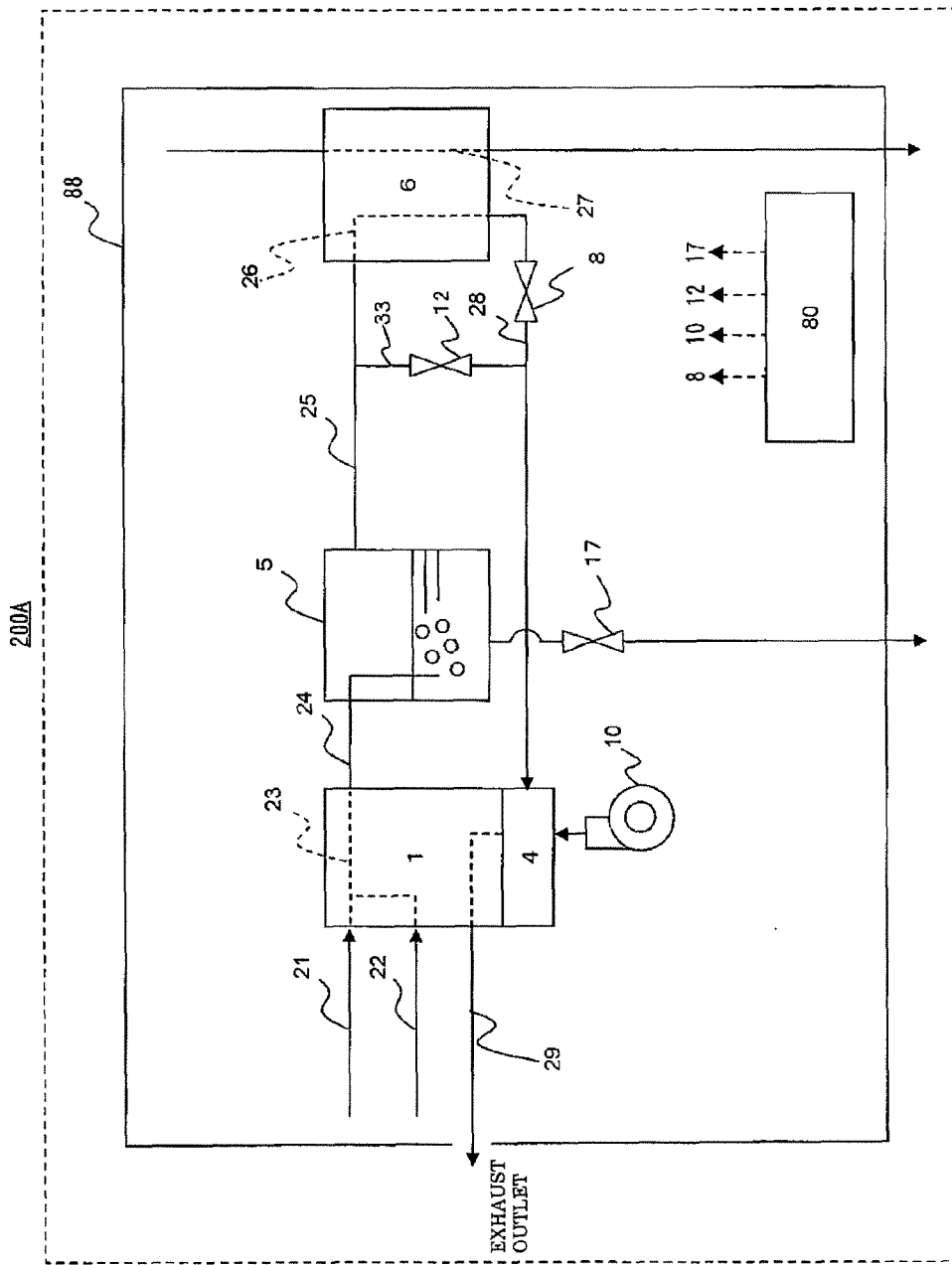
FIG. 8 is a schematic diagram showing an example of a schematic configuration of a fuel cell system according to Embodiment 3.

FIG. 8 is a schematic diagram showing an example of a schematic configuration of the fuel cell system according to Embodiment 3.

A fuel cell system 200A according to Embodiment 3 is such that the fuel cell system 100A according to Embodiment 1 further includes a branch passage 33 which connects the second fuel gas passage 25 and the exhaust fuel gas passage 28 in a manner to bypass the fuel cell 6. The bypass passage partially shares the same passage with the exhaust fuel gas passage 28. The bypass passage includes the branch passage 33 and a downstream passage of the exhaust fuel gas passage 28, the downstream passage being downstream from a point where the exhaust fuel gas passage 28 and the branch passage 33 merge. The branch passage 33 is provided with a third on-off valve 12. The third on-off valve 12 is communicably connected to the controller 80, and is configured to be controlled by the controller 80. It should be noted that the third on-off valve 12 may be provided at any position, so long as the third on-off valve 12 is provided on the bypass passage. For example, the third on-off valve 12 may be provided on the downstream passage of the exhaust fuel gas passage 28, the downstream passage being downstream from the point where the exhaust fuel gas passage 28 and the branch passage 33 merge. The other components of the fuel cell system 200A according to Embodiment 3 are configured in the same manner as components in the fuel cell system 100A. Therefore, such common components between the fuel system 200A and the fuel cell system 100A are denoted by the same reference signs and names, and a description of such components will be omitted.

For example, the bypass passage is used at the start-up of the fuel cell system 200A to supply the hydrogen-containing gas generated in the reformer 1 to the combustor 4 without supplying the hydrogen-containing gas to the fuel cell 6. At the time, the third on-off valve 12 is opened and the first on-off valve 8 is closed. During the power generation operation of the fuel cell system, the first on-off valve 8 is opened and the third on-off valve 12 is closed. Accordingly, the hydrogen-containing gas generated in the reformer 1 is supplied to the fuel cell 6.

The water draining process of the ammonia remover 5 is performed by opening the second on-off valve 17 when the power generation operation of the fuel cell system 200A is in a stopped state.

It should be noted that while the power generation operation is stopped, the first water supply device and the raw material supply device are stopped from operating and the first water passage 21 and the raw material passage 22 are closed. In the water draining process, at least the third on-off valve 12 is opened. It should be noted that the first on-off valve 8 may be either opened or closed in the water draining process.

It is preferred that the third on-off valve 12 is opened automatically through control by the controller 80. It is also preferred that the second on-off valve 17 is opened automatically through control by the controller 80. Alternatively, the fuel cell system 200A may be configured such that at least one of the second on-off valve 17 and the third on-off valve 12 is manually opened by an operator. In this case, it is preferred that the on-off valve(s) to be manually opened by the operator is provided outside of the casing 88. Then, out of the second on-off valve 17 and the third on-off valve 12, an on-off valve that is not manually opened by the operator is automatically opened through control by the controller 80.

According to the above configuration and operations, water within the ammonia remover is properly discharged in the water draining process of the ammonia remover.

In the fuel cell system according to the present embodiment, the fluid passage includes the second fuel gas passage 25, the bypass passage, the combustor 4, and the flue gas passage 29, and the on-off valve provided on the fluid passage and configured to allow and block the communication between the ammonia remover and the atmosphere corresponds to the third on-off valve 12.

Embodiment 4

A fuel cell system according to Embodiment 4 is such that any one of the fuel cell systems according to Embodiment 2 and the variations thereof further includes a bypass passage configured to supply the hydrogen-containing gas generated in the reformer to the combustor in a manner to bypass the fuel cell. The fluid passage is configured to extend through the bypass passage.

Other than the above features, the fuel cell system according to the present embodiment may be configured in the same manner as at least one of the fuel cell systems according to Embodiment 1, Embodiment 2, and the variations of these embodiments.

Figure 9:
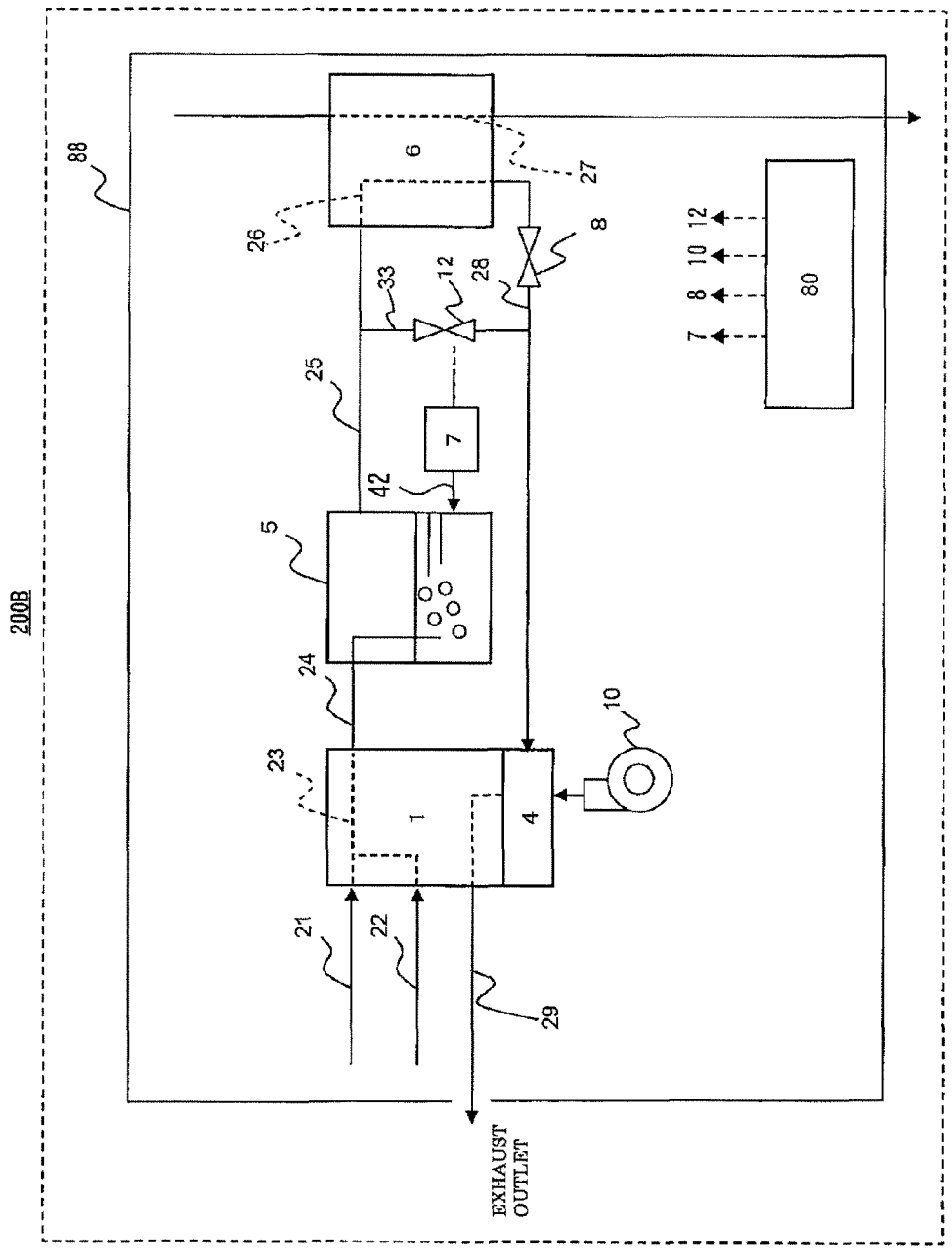
FIG. 9 is a schematic diagram showing an example of a schematic configuration of a fuel cell system according to Embodiment 4.

FIG. 9 is a schematic diagram showing an example of a schematic configuration of the fuel cell system according to Embodiment 4.

A fuel cell system 200B according to Embodiment 4 is such that the fuel cell system 100B according to Embodiment 2 further includes a branch passage 33 which connects the second fuel gas passage 25 and the exhaust fuel gas passage 28 in a manner to bypass the fuel cell 6. The bypass passage partially shares the same passage with the exhaust fuel gas passage 28. The bypass passage includes the branch passage 33 and a downstream passage of the exhaust fuel gas passage 28, the downstream passage being downstream from a point where the exhaust fuel gas passage 28 and the branch passage 33 merge. The branch passage 33 is provided with the third on-off valve 12. The third on-off valve 12 is communicably connected to the controller 80, and is configured to be controlled by the controller 80. It should be noted that the third on-off valve 12 may be provided at any position, so long as the third on-off valve 12 is provided on the bypass passage. For example, the third on-off valve 12 may be provided on the downstream passage of the exhaust fuel gas passage 28, the downstream passage being downstream from the point where the exhaust fuel gas passage 28 and the branch passage 33 merge. The other components of the fuel cell system 200B according to Embodiment 4 are configured in the same manner as components in the fuel cell system 100B. Therefore, such common components between the fuel cell system 200B and the fuel cell system 100B are denoted by the same reference signs and names, and a description of such components will be omitted.

For example, the bypass passage is used at the start-up of the fuel cell system 200B to supply the hydrogen-containing gas generated in the reformer 1 to the combustor 4 without supplying the hydrogen-containing gas to the fuel cell 6. At the time, the third on-off valve 12 is opened and the first on-off valve 8 is closed. During the power generation operation of the fuel cell system, the first on-off valve 8 is opened and the third on-off valve 12 is closed. Accordingly, the hydrogen-containing gas generated in the reformer 1 is supplied to the fuel cell 6.

The water loading process of the ammonia remover 5 is performed when the power generation operation of the fuel cell system 200B is in a stopped state.

It should be noted that while the power generation operation is stopped, the first water supply device and the raw material supply device are stopped from operating and the first water passage 21 and the raw material passage 22 are closed. In the water loading process, at least the third on-off valve 12 is opened. It should be noted that the first on-off valve 8 may be either opened or closed in the water loading process.

That is, in the present embodiment as compared to Embodiment 2, the branch passage 33 instead of the anode-side passage 26 of the fuel cell 6 forms a part of the fluid passage, and the third on-off valve 12 instead of the first on-off valve 8 serves as an on-off valve for opening the fluid passage.

It is preferred that the third on-off valve 12 is opened automatically through control by the controller 80. However, as an alternative, the fuel cell system 200B may be configured such that the third on-off valve 12 is manually opened by an operator. In this case, it is preferred that the on-off valve to be manually opened by the operator is provided outside of the casing 88.

According to the above configuration and operations, water can be properly supplied to the inside of the ammonia remover in the water loading process of the ammonia remover.

In the fuel cell system according to the present embodiment, the fluid passage includes the second fuel gas passage 25, the bypass passage, the combustor 4, and the flue gas passage 29, and the on-off valve provided on the fluid passage and configured to allow and block the communication between the ammonia remover and the atmosphere corresponds to the third on-off valve 12.

Embodiment 5

A fuel cell system according to Embodiment 5 is such that, in any one of the fuel cell systems according to Embodiments 1 to 4 and the variations thereof, the fluid passage is a passage configured to discharge a fluid different from the hydrogen-containing gas to the atmosphere.

The fuel cell system according to Embodiment 5 further includes a water tank open to the atmosphere, which stores water recovered from an exhaust gas in the fuel cell system. In the fuel cell system according to Embodiment 5, the passage configured to discharge a fluid different from the hydrogen-containing gas to the atmosphere may be connected to the water tank.

The fuel cell system according to Embodiment 5 further includes: a combustor configured to combust the hydrogen-containing gas that is sent out from the reformer; and an air supply device configured to supply combustion air to the combustor. In the fuel cell system according to Embodiment 5, the water tank is in communication with a passage for flue gas via a passage through which water removed from the flue gas flows, and the controller is configured to operate the air supply device when the on-off valve is open.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

The present embodiment describes a case where a passage extending through the reformer serves as an example of the passage configured to discharge a fluid different from the hydrogen-containing gas to the atmosphere, and a tank storing water recovered from the flue gas serves as an example of the water tank.

Other than the above features, the fuel cell system according to the present embodiment may be configured in the same manner as at least one of the fuel cell systems according to Embodiments 1 to 4 and the variations thereof.

Figure 10:
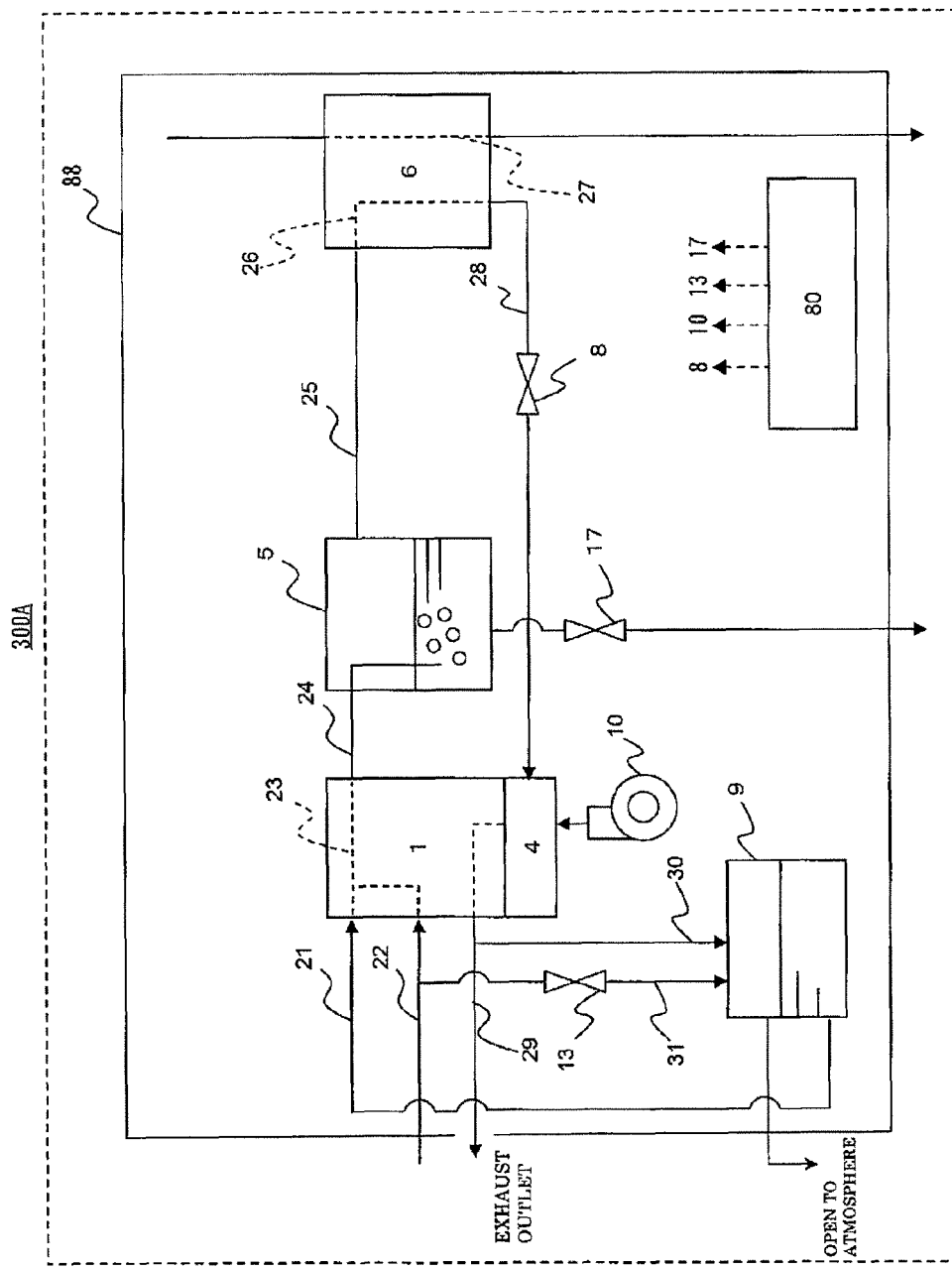
FIG. 10 is a schematic diagram showing an example of a schematic configuration of a fuel cell system according to Embodiment 5.

FIG. 10 is a schematic diagram showing an example of a schematic configuration of the fuel cell system according to Embodiment 5.

A fuel cell system 300A according to Embodiment 5 is such that the fuel cell system 100A according to Embodiment 1 further includes a water tank 9, a fourth on-off valve 13, a branch passage 30, and a passage 31. The water tank 9 stores water recovered from a flue gas, and is open to the atmosphere. The branch passage 30 is a passage branching off from the flue gas passage 29, and is configured to connect to the water tank 9. The passage 31 is a passage branching off from the raw material passage 22 and connecting to the water tank 9. The fourth on-off valve 13 is provided on the passage 31. The fourth on-off valve 13 is communicably connected to the controller 80, and is configured to be controlled by the controller 80. The other components of the fuel cell system 300A according to Embodiment 5 are configured in the same manner as components in the fuel cell system 100A. Therefore, such common components between the fuel cell system 300A and the fuel cell system 100A are denoted by the same reference signs and names, and a description of such components will be omitted.

The water draining process of the ammonia remover 5 is performed by opening the second on-off valve 17 when the power generation operation of the fuel cell system 300A is in a stopped state. It should be noted that while the power generation operation is stopped, the first water supply device and the raw material supply device are stopped from operating and the first water passage 21 and the raw material passage 22 are closed.

In the water draining process, at least the fourth on-off valve 13 is opened. It should be noted that the first on-off valve 8 may be either opened or closed in the water draining process.

It is preferred that the fourth on-off valve 13 is opened automatically through control by the controller 80. It is also preferred that the second on-off valve 17 is opened automatically through control by the controller 80. Alternatively, the fuel cell system 300A may be configured such that at least one of the second on-off valve 17 and the fourth on-off valve 13 is manually opened by an operator. In this case, it is preferred that the on-off valve(s) to be manually opened by the operator is provided outside of the casing 88. Then, out of the second on-off valve 17 and the fourth on-off valve 13, an on-off valve that is not manually opened by the operator is automatically opened through control by the controller 80.

According to the above configuration and operations, water within the ammonia remover is properly discharged in the water draining process of the ammonia remover.

In the fuel cell system according to the present embodiment, the fluid passage includes a first fuel gas passage 24, the passage 23 in the reformer 1, the raw material passage 22, and the passage 31, and the on-off valve provided on the fluid passage and configured to allow and block the communication between the ammonia remover and the atmosphere corresponds to the fourth on-off valve 13.

Although in the above-described example the passage 31 is used as a part of the fluid passage that allows the ammonia remover 5 to be in communication with the atmosphere during the water draining process of draining water from the inside of the ammonia remover 5, the passage 31 may be used for other purposes. For example, the passage 31 may be used as a part of a fluid passage for releasing an increased internal pressure of the reformer 1 to the atmosphere. To be specific, the reformer 1 is sealed while the power generation operation of the fuel cell system 300A is stopped. At the time, there may be a case where water remaining in the reformer 1 (i.e., in at least one of the reforming part and the evaporating part) evaporates due to residual heat and thereby the internal pressure of the reformer 1 increases. In this case, by opening the fourth on-off valve 13, the reformer 1 becomes open to the atmosphere. As a result, the increase in the internal pressure of the reformer 1 is reduced.

Optionally, in the water draining process of the fuel cell system according to the present embodiment, the combustion air supply device 10 may be operated when the fourth on-off valve 13 is open.

Accordingly, the pressure in the passage 31 connecting the ammonia remover 5 and the water tank 9 via the flue gas passage 29 and the branch passage 30 increases. As a result, water remaining within the ammonia remover 5 can be drained more efficiently.

Figure 11A:
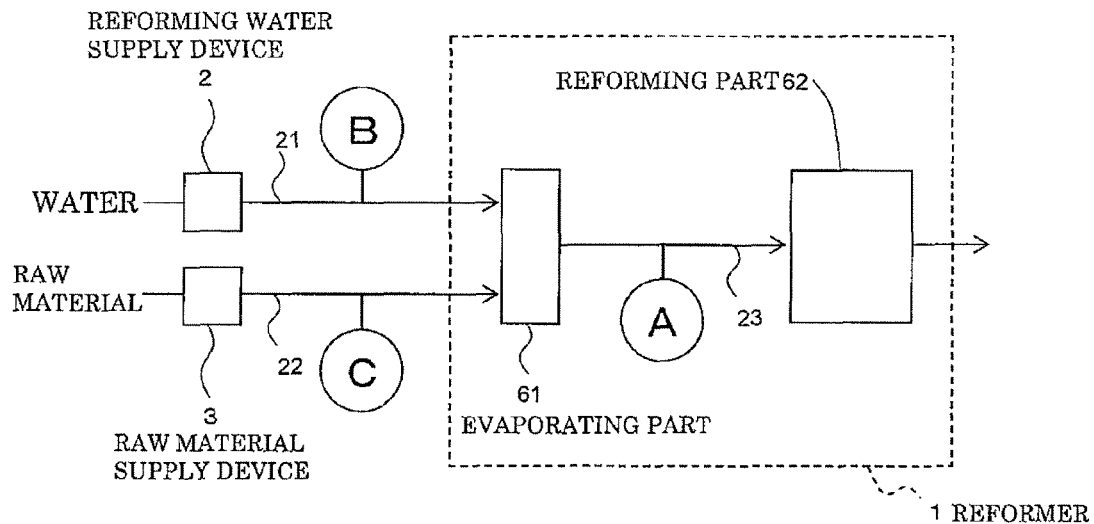
FIGS. 11A and 11B are schematic diagrams each showing examples of a position where a passage 31 is disposed in the fuel cell system according to Embodiment 5.
Figure 11B:
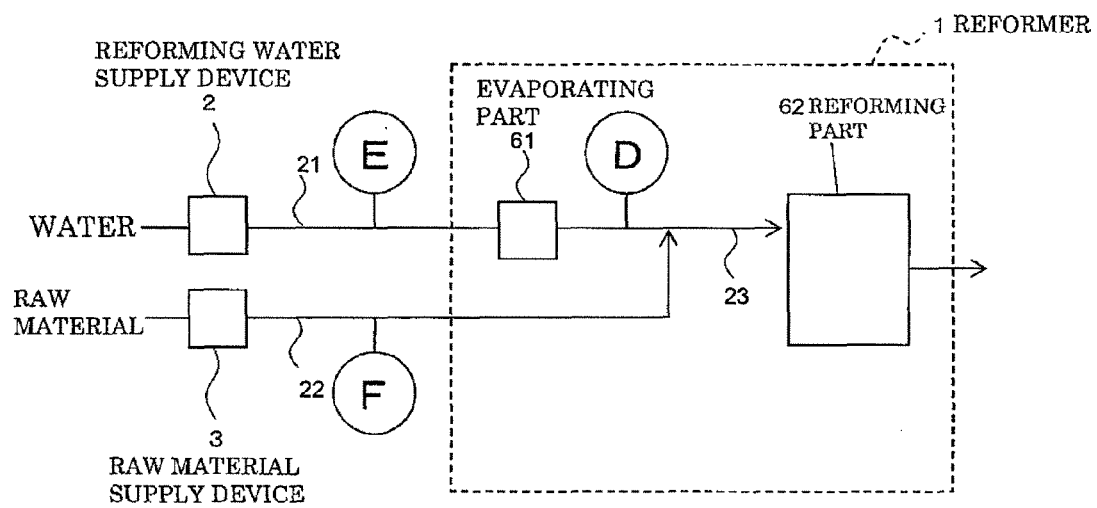

FIGS. 11A and 11B are schematic diagrams each showing examples of a position where the passage 31 is disposed in the fuel cell system according to Embodiment 5; FIG. 11A shows a case where the evaporating part is configured to evaporate water and to allow the raw material to flow through; and FIG. 11B shows a case where steam is generated at the evaporating part and thereafter the raw material is mixed into the steam at a downstream position.

Each of FIGS. 11A and 11B shows an evaporating part 61 and a reforming part 62 (which are omitted in FIGS. 1, 3, 6, 8, 9, and 10) as components of the reformer 1. The evaporating part 61 is connected to a first water supply device 2, and evaporates water supplied from the first water supply device 2, thereby generating steam. The reforming part 62 includes a reforming catalyst, and generates a hydrogen-containing gas from the steam supplied from the evaporating part 61 and a raw material supplied from a raw material supply device 3.

FIG. 11A shows a configuration example in which the first water supply device 2 and the raw material supply device 3 are connected to the evaporating part 61 in parallel. In this case, the passage 31 may be provided at any of the following positions on the passage 23: a position on a passage between the evaporating part 61 and the reforming part 62 (i.e., position A shown in the diagram); a position on a passage between the first water supply device 2 and the evaporating part 61 (i.e., position B shown in the diagram); and a position on a passage between the raw material supply device 3 and the evaporating part 61 (i.e., position C shown in the diagram). The passage 31 may branch off either at the inside or the outside of the reformer 1.

FIG. 11B shows a configuration example in which the first water supply device 2, the evaporating part 61, and the reforming part 62 are serially connected, and the gas outlet of the raw material supply device 3 is connected between the evaporating part 61 and the reforming part 62. In this case, the passage 31 may be provided at any of the following positions on the passage 23: a position on a passage between the evaporating part 61 and the reforming part 62 (i.e., position D shown in the diagram); a position on a passage between the first water supply device 2 and the evaporating part 61 (i.e., position E shown in the diagram); and a position on a passage between the raw material supply device 3 and the passage 23 (i.e., position F shown in the diagram). The passage 31 may branch off either at the inside or the outside of the reformer 1.

The same variations as those of Embodiments 1 to 4 can be realized with the present embodiment.

The present embodiment or the variations thereof may be implemented in combination with Embodiment 2, Embodiment 4, or the variations of these embodiments.

Embodiment 6

A fuel cell system according to Embodiment 6 is such that, in any one of the fuel cell systems according to Embodiments 1 to 5 and the variations thereof, the fluid passage is a passage configured to discharge a fluid different from the hydrogen-containing gas to the atmosphere.

The fuel cell system according to Embodiment 6 further includes a water tank open to the atmosphere, which stores water recovered from an exhaust gas in the fuel cell system. In the fuel cell system according to Embodiment 6, the passage configured to discharge a fluid different from the hydrogen-containing gas to the atmosphere may be connected to the water tank.

The fuel cell system according to Embodiment 6 further includes: a combustor configured to combust the hydrogen-containing gas that is sent out from the reformer; and an air supply device configured to supply combustion air to the combustor. In the fuel cell system according to Embodiment 6, the water tank is in communication with a passage for flue gas via a passage through which water removed from the flue gas flows, and the controller is configured to operate the air supply device when the on-off valve is open.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

The present embodiment describes a case where a passage extending through the reformer serves as an example of the passage configured to discharge a fluid different from the hydrogen-containing gas to the atmosphere, and a tank storing water recovered from the flue gas serves as an example of the water tank.

Other than the above features, the fuel cell system according to the present embodiment may be configured in the same manner as at least one of the fuel cell systems according to Embodiments 1 to 5 and the variations thereof.

Figure 12:
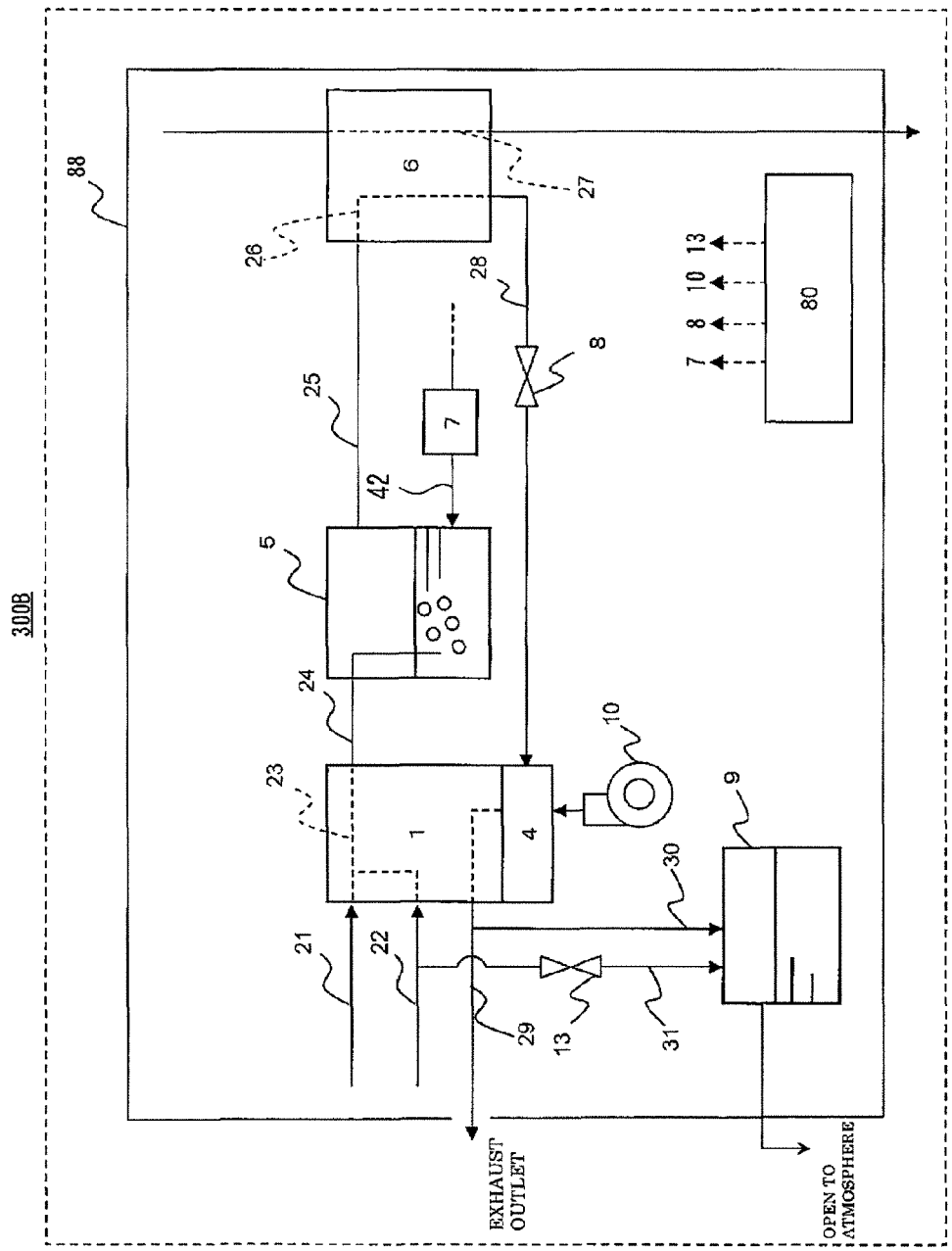
FIG. 12 is a schematic diagram showing an example of a schematic configuration of a fuel cell system according to Embodiment 6.

FIG. 12 is a schematic diagram showing an example of a schematic configuration of the fuel cell system according to Embodiment 6.

A fuel cell system 300B according to Embodiment 6 is such that the fuel cell system 100B according to Embodiment 2 further includes the water tank 9, the fourth on-off valve 13, the branch passage 30, and the passage 31. The water tank 9 stores water recovered from a flue gas, and is open to the atmosphere. The branch passage 30 is a passage branching off from the flue gas passage 29, and is configured to connect to the water tank 9. The passage 31 is a passage branching off from the raw material passage 22 and connecting to the water tank 9. The fourth on-off valve 13 is provided on the passage 31. The fourth on-off valve 13 is communicably connected to the controller 80, and is configured to be controlled by the controller 80. The other components of the fuel cell system 300B according to Embodiment 6 are configured in the same manner as components in the fuel cell system 100B. Therefore, such common components between the fuel cell system 300B and the fuel cell system 100B are denoted by the same reference signs and names, and a description of such components will be omitted.

The water loading process of the ammonia remover 5 is performed when the power generation operation of the fuel cell system 300B is in a stopped state. It should be noted that while the power generation operation is stopped, the first water supply device and the raw material supply device are stopped from operating and the first water passage 21 and the raw material passage 22 are closed.

In the water loading process, at least the fourth on-off valve 13 is opened. It should be noted that the first on-off valve 8 may be either opened or closed in the water loading process. In this case, it is preferred that an on-off valve to be manually opened by an operator is provided outside of the casing 88.

It is preferred that the fourth on-off valve 13 is opened automatically through control by the controller 80. Alternatively, the fuel cell system 300A may be configured such that the fourth on-off valve 13 is manually opened by an operator.

In this case, it is preferred that the on-off valve to be manually opened by the operator is provided outside of the casing 88.

According to the above configuration and operations, water can be properly supplied to the inside of the ammonia remover in the water loading process of the ammonia remover.

In the fuel cell system according to the present embodiment, the fluid passage includes the first fuel gas passage 24, the passage 23 in the reformer 1, the raw material passage 22, and the passage 31, and the on-off valve provided on the fluid passage and configured to allow and block the communication between the ammonia remover and the atmosphere corresponds to the fourth on-off valve 13.

Although in the above-described example the passage 31 is used as a part of the fluid passage that allows the ammonia remover 5 to be in communication with the atmosphere during the water draining process of draining water from the inside of the ammonia remover 5, the passage 31 may be used for other purposes. In this respect, Embodiment 6 is the same as Embodiment 5.

Optionally, in the water loading process of the fuel cell system according to the present embodiment, the combustion air supply device 10 may be operated when the first on-off valve 13 is open.

According to the above configuration, even if a gas that remains in the fluid passage at a position upstream from the combustor contains a combustible gas, the gas is diluted by the combustion air and discharged. This improves safety as compared to a case where the air supply device is not operated when the water loading is performed.

In Embodiment 6, the passage 31 may be disposed in such a position as described in Embodiment 5 with reference to FIG. 11.

In the water loading process of the ammonia remover 5 of the fuel cell system 300B, the ammonia remover 5 becomes open to the atmosphere also when the first on-off valve 8, instead of the fourth on-off valve 13, is opened. Since the mechanics and operations performed in this case to cause the ammonia remover 5 to become open to the atmosphere are the same as in Embodiment 2, a detailed description thereof will be omitted.

In the water loading process of the ammonia remover 5 of the fuel cell system 300B, both the fourth on-off valve 13 and the first on-off valve 8 may be opened. In this case, the communication between the ammonia remover 5 and the atmosphere is further facilitated, and the water loading into the ammonia remover can be performed more speedily.

The present embodiment or variations thereof may be implemented in combination with Embodiment 1, Embodiment 3, Embodiment 5, or the variations of these embodiments.

Embodiment 7

A fuel cell system according to Embodiment 7 is such that, in any one of the fuel cell systems according to Embodiments 1 to 6 and the variations thereof, the fluid passage is a passage configured to discharge a fluid different from the hydrogen-containing gas to the atmosphere.

The fuel cell system according to Embodiment 7 further includes a water tank open to the atmosphere, which stores water recovered from an exhaust gas in the fuel cell system. In the fuel cell system according to Embodiment 7, the passage configured to discharge a fluid different from the hydrogen-containing gas to the atmosphere may be connected to the water tank.

The fuel cell system according to Embodiment 7 further includes an air supply device configured to supply air as an oxidizing gas to the fuel cell. In the fuel cell system according to Embodiment 7, the water tank stores water removed from an off oxidizing gas discharged from the fuel cell, and the controller is configured to operate the air supply device when the on-off valve is open in the water draining process.

According to the above configuration, the pressure in the fluid passage that connects the ammonia remover and the water tank increases. Therefore, as compared to a case where the air supply device is not operated, water remaining within the ammonia remover can be drained more efficiently.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

The present embodiment describes a case where, in the fuel cell system, a passage extending through the reformer serves as an example of the passage configured to discharge a fluid different from the hydrogen-containing gas to the atmosphere, and a tank storing water recovered from the off oxidizing gas serves as an example of the water tank.

Other than the above features, the fuel cell system according to the present embodiment may be configured in the same manner as at least one of the fuel cell systems according to Embodiments 1 to 6 and the variations thereof.

Figure 13:
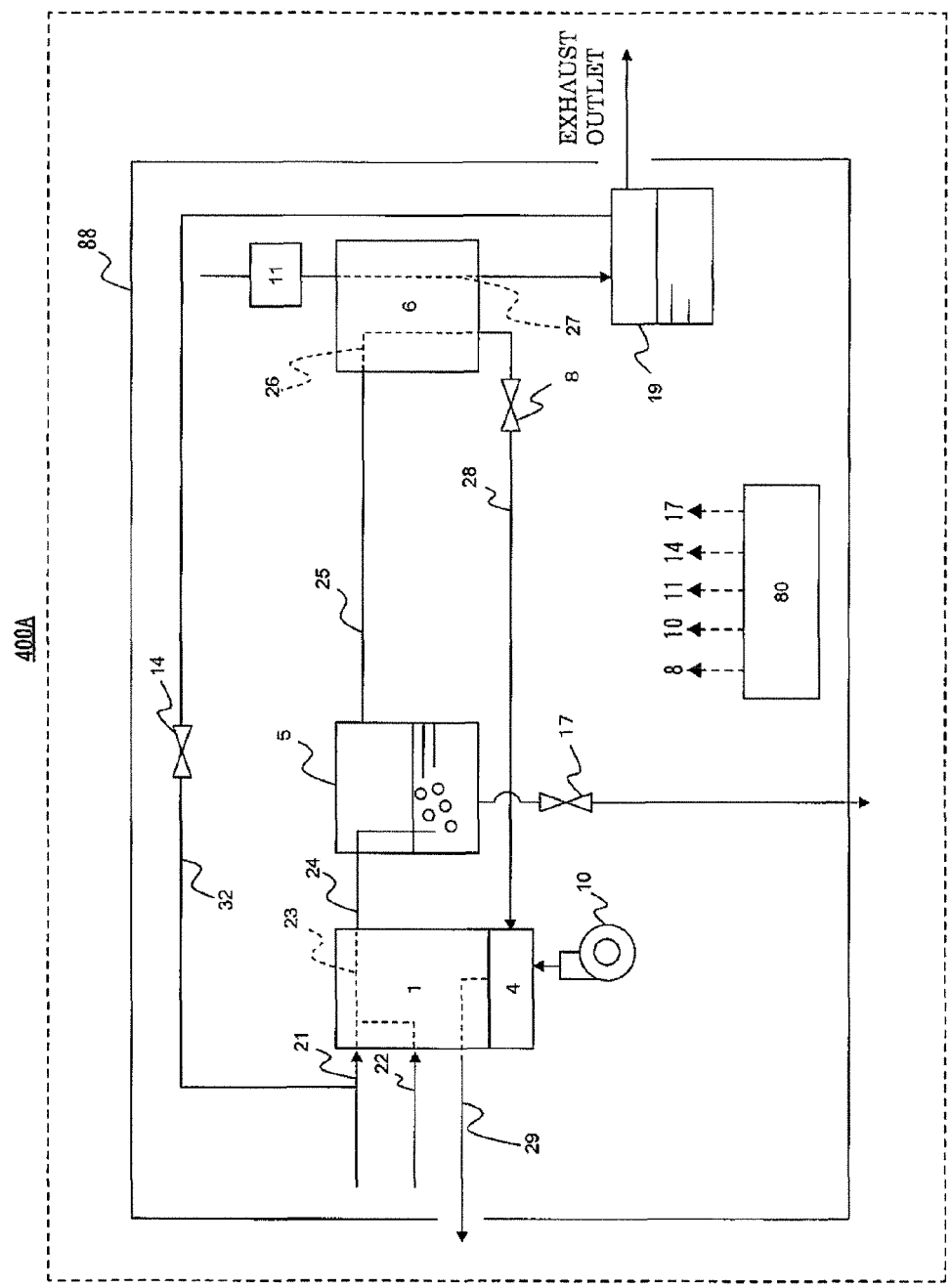
FIG. 13 is a schematic diagram showing an example of a schematic configuration of a fuel cell system according to Embodiment 7.

FIG. 13 is a schematic diagram showing an example of a schematic configuration of the fuel cell system according to Embodiment 7.

A fuel cell system 400A according to Embodiment 7 is such that the fuel cell system 100A according to Embodiment 1 further includes an oxidizing gas supply device 11, a fifth on-off valve 14, a water tank 19, and a passage 32. The oxidizing gas supply device 11 supplies an oxidizing gas to the cathode-side passage 27 of the fuel cell 6. The water tank 19 stores water removed from an exhaust oxidizing gas (off oxidizing gas), and is open to the atmosphere. The passage 32 is a passage branching off from the first water passage 21 and connecting to the water tank 19. The fourth on-off valve 13 is provided on the passage 32.

It should be noted that the passage 32 is exemplified by a passage that branches off at the position B or E shown in FIG. 11. The passage 32 is provided with the fifth on-off valve 14. The fifth on-off valve 14 is communicably connected to the controller 80. The other components of the fuel cell system 400A according to Embodiment 7 are configured in the same manner as components in the fuel cell system 100A. Therefore, such common components between the fuel cell system 400A and the fuel cell system 100A are denoted by the same reference signs and names, and a description of such components will be omitted.

It should be noted that the passage 32 may branch off at any position, so long as the passage 32 branches off from a passage that supplies a reactant to the reforming part 62. The position at which the passage 32 branches off is not limited to the position shown in FIG. 13 but may be, for example, any position from among the positions A to F shown in FIG. 11.

The water draining process of the fuel cell system 400A is performed by opening the second on-off valve 17 when the power generation operation of the fuel cell system 400A is in a stopped state. In the water draining process, at least the fifth on-off valve 14 is opened. It should be noted that the first on-off valve 8 may be either opened or closed in the water draining process.

It is preferred that the fifth on-off valve 14 is opened automatically through control by the controller 80. It is also preferred that the second on-off valve 17 is opened automatically through control by the controller 80. Alternatively, the fuel cell system 400A may be configured such that at least one of the second on-off valve 17 and the fifth on-off valve 14 is manually opened by an operator. In this case, it is preferred that the on-off valve(s) to be manually opened by the operator is provided outside of the casing 88. Then, out of the second on-off valve 17 and the fifth on-off valve 14, an on-off valve that is not manually opened by the operator is automatically opened through control by the controller 80.

According to the above configuration and operations, water within the ammonia remover is properly discharged in the water draining process of the ammonia remover.

In the fuel cell system according to the present embodiment, the fluid passage includes the first fuel gas passage 24, the passage 23 in the reformer 1, the first water passage 21, and the passage 32, and the on-off valve provided on the fluid passage and configured to allow and block the communication between the ammonia remover and the atmosphere corresponds to the fifth on-off valve 14.

Although in the above-described example the passage 32 is used as a part of the fluid passage that allows the ammonia remover 5 to be in communication with the atmosphere during the water draining process of draining water from the inside of the ammonia remover 5, the passage 32 may be used for other purposes. For example, the passage 32 may be used as a part of a fluid passage for releasing an increased internal pressure of the reformer 1 to the atmosphere. To be specific, the reformer 1 is sealed while the power generation operation of the fuel cell system 300A is stopped. At the time, there may be a case where water remaining in the reformer 1 (i.e., in at least one of the reforming part and the evaporating part) evaporates due to residual heat and thereby the internal pressure of the reformer 1 increases. In this case, by opening the fifth on-off valve 14, the reformer 1 becomes open to the atmosphere. As a result, the increase in the internal pressure of the reformer 1 is reduced.

Optionally, in the water draining process of the fuel cell system according to the present embodiment, the oxidizing gas supply device 11 may be operated when the fifth on-off valve 14 is open.

Accordingly, the pressure in the fluid passage that connects the ammonia remover 5 and the water tank 19 increases. As a result, water remaining within the ammonia remover 5 can be drained more efficiently.

Embodiment 8

A fuel cell system according to Embodiment 8 is such that, in any one of the fuel cell systems according to Embodiments 1 to 7 and the variations thereof, the fluid passage is a passage configured to discharge a fluid different from the hydrogen-containing gas to the atmosphere.

The fuel cell system according to Embodiment 8 further includes a water tank open to the atmosphere, which stores water recovered from an exhaust gas in the fuel cell system. In the fuel cell system according to Embodiment 8, the passage configured to discharge a fluid different from the hydrogen-containing gas to the atmosphere may be connected to the water tank.

The fuel cell system according to Embodiment 8 further includes an air supply device configured to supply air as an oxidizing gas to the fuel cell. In the fuel cell system according to Embodiment 8, the water tank stores water removed from an off oxidizing gas discharged from the fuel cell, and the controller is configured to operate the air supply device when the on-off valve is open in the water loading process.

According to the above configuration, even if a gas that remains in the fluid passage at a position upstream from the combustor contains a combustible gas, the gas is diluted by the combustion air and discharged. This improves safety as compared to a case where the air supply device is not operated when the water loading is performed.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

The present embodiment describes a case where, in the fuel cell system, a passage extending through the reformer serves as an example of the passage configured to discharge a fluid different from the hydrogen-containing gas to the atmosphere, and a tank storing water recovered from the off oxidizing gas serves as an example of the water tank.

Other than the above features, the fuel cell system according to the present embodiment may be configured in the same manner as at least one of the fuel cell systems according to Embodiments 1 to 7 and the variations thereof.

Figure 14:
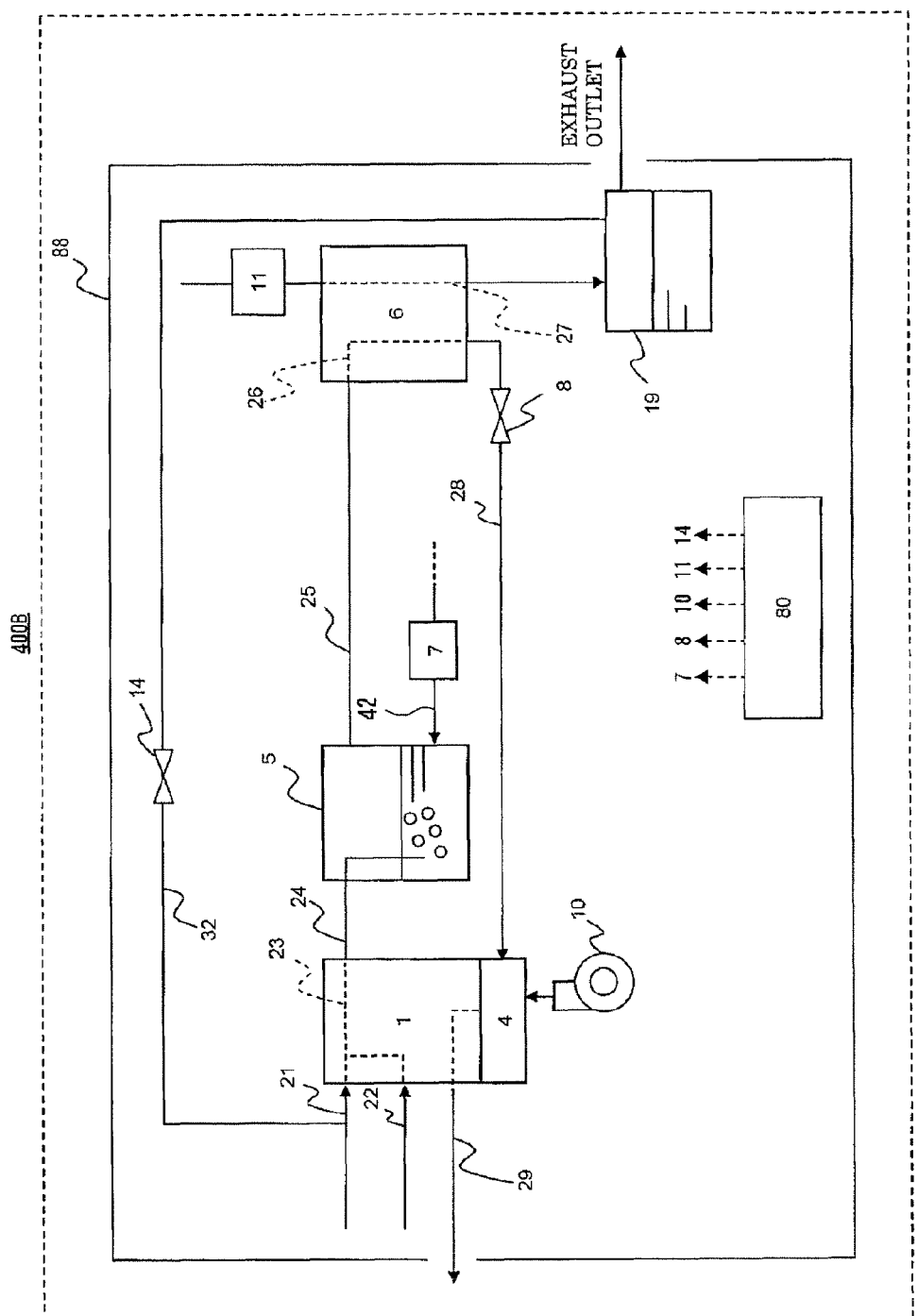
FIG. 14 is a schematic diagram showing an example of a schematic configuration of a fuel cell system according to Embodiment 8.

FIG. 14 is a schematic diagram showing an example of a schematic configuration of the fuel cell system according to Embodiment 8.

A fuel cell system 400B according to Embodiment 8 is such that the fuel cell system 100B according to Embodiment 2 further includes the oxidizing gas supply device 11, the fifth on-off valve 14, the water tank 19, and the passage 32. The oxidizing gas supply device 11 supplies an oxidizing gas to the cathode-side passage 27 of the fuel cell 6. The water tank 19 stores water removed from an exhaust oxidizing gas (off oxidizing gas), and is open to the atmosphere. The passage 32 is a passage branching off from the first water passage 21 and connecting to the water tank 19. The fourth on-off valve 13 is provided on the passage 32.

It should be noted that the passage 32 is exemplified by a passage that branches off at the position B or E shown in FIG. 9. The passage 32 is provided with the fifth on-off valve 14. The fifth on-off valve 14 is communicably connected to the controller 80. The other components of the fuel cell system 400B according to Embodiment 8 are configured in the same manner as components in the fuel cell system 100B. Therefore, such common components between the fuel cell system 400B and the fuel cell system 100B are denoted by the same reference signs and names, and a description of such components will be omitted.

It should be noted that the passage 32 may branch off at any position, so long as the passage 32 branches off from a passage that supplies a reactant to the reforming part 62. The position at which the passage 32 branches off is not limited to the position shown in FIG. 14 but may be, for example, any position from among the positions A to F shown in FIG. 11.

The water loading process of the ammonia remover 5 of the fuel cell system 400B is performed by opening the fifth on-off valve 14 when the power generation operation of the fuel cell system 400B is in a stopped state. It should be noted that the first on-off valve 8 may be either opened or closed in the water loading process.

It is preferred that the fifth on-off valve 14 is opened automatically through control by the controller 80. Alternatively, the fuel cell system 400B may be configured such that the fifth on-off valve 14 is manually opened by an operator. In this case, it is preferred that the on-off valve to be manually opened by the operator is provided outside of the casing 88.

According to the above configuration and operations, water is properly supplied to the inside of the ammonia remover in the water loading process of the ammonia remover.

In the fuel cell system according to the present embodiment, the fluid passage includes the first fuel gas passage 24, the passage 23 in the reformer 1, the first water passage 21, and the passage 32, and the on-off valve provided on the fluid passage and configured to allow and block the communication between the ammonia remover and the atmosphere corresponds to the fifth on-off valve 14.

Although in the above-described example the passage 32 is used as a part of the fluid passage that allows the ammonia remover 5 to be in communication with the atmosphere during the water loading process of loading water into the ammonia remover 5, the passage 32 may be used for other purposes. In this respect, Embodiment 8 is the same as Embodiment 7.

Optionally, in the water loading process of the fuel cell system according to the present embodiment, the oxidizing gas supply device 11 may be operated when the fifth on-off valve 14 is open.

Accordingly, even if a gas that remains in the fluid passage at a position upstream from the water tank 19 contains a combustible gas, the gas is diluted by the oxidizing gas and discharged. This improves safety as compared to a case where the oxidizing gas supply device 11 is not operated when the water loading is performed.

[Variation]

A fuel cell system according to a variation of Embodiment 8 is such that, in the fuel cell system according to Embodiment 8, the controller is configured to operate the air supply device, which is configured to supply air as an oxidizing gas, when the on-off valve is open, which on-off valve is configured to allow and block the communication between the ammonia remover and the atmosphere.

During the water loading process, a gas that remains in the fluid passage leading to the water tank is pushed out into the water tank, and discharged to the atmosphere through the water tank. Even if a gas that remains in the fluid passage at a position upstream from the water tank 19 contains a combustible gas, the gas is diluted by the oxidizing gas and discharged. This improves safety as compared to a case where the oxidizing gas supply device 11 is not operated when the water loading is performed.

Here, "to operate the air supply device, which is configured to supply air as an oxidizing gas, when the on-off valve is open" means operating the oxidizing gas supply device for at least a part of a period over which the on-off valve is open. For example, the oxidizing gas supply device may be operated continuously or intermittently for the period over which the on-off valve is open, or operated only for a part of the period.

Since the fuel cell system is configured as described above, even if a gas that remains in the fluid passage contains a combustible gas, when the gas has flowed into the water tank, the gas is diluted by air supplied to the water tank, and then discharged. This improves safety as compared to a case where the air supply device is not operated.

Other than the above features, the fuel cell system according to the variation of Embodiment 8 may be configured in the same manner as at least one of the fuel cell systems according to Embodiments 1 to 8 and the variations thereof.

Next, a specific configuration of the fuel cell system according to the variation of Embodiment 8 is described.

The fuel cell system according to the variation of Embodiment 8 includes the same components as those described in Embodiment 8.

In the fuel cell system according to the variation of Embodiment 8, the controller 80 is configured to operate the oxidizing gas supply device 11 when the fifth on-off valve 14 is open in the water loading process. In the water loading process, a gas in a volume that corresponds to the volume of water flowing into the ammonia remover 5 flows into the water tank 19 through the passage 32. The gas that has flowed into the water tank 19 is diluted by air that flows into the water tank 19 when the oxidizing gas supply device 11 is operated, and the diluted gas is discharged through an exhaust outlet of the water tank 19. Thus, the dilution of sealed gas performed in the variation of Embodiment 8 is different from the dilution of sealed gas performed in Variation 1 of Embodiment 2, in that the dilution of sealed gas performed in the variation of Embodiment 8 uses the oxidizing gas supply device 11 instead of the combustion air supply device 10. Other than this difference, the variation of Embodiment 8 is the same as Variation 1 of Embodiment 2, including the setting of the operating amount of the oxidizing gas supply device 11. Therefore, a further description of the variation of Embodiment 8 is omitted.

According to the above configuration, the safety is further improved as compared to a case where the oxidizing gas supply device 11 is not operated when the fifth on-off valve 14 is open.

Embodiment 9

A fuel cell system according to Embodiment 9 is such that, in any one of the fuel cell systems according to Embodiments 1 to 8 and the variations thereof, the fluid passage is a passage configured to discharge a fluid different from the hydrogen-containing gas to the atmosphere.

The fuel cell system according to Embodiment 9 further includes a water tank open to the atmosphere, which stores water recovered from an exhaust gas in the fuel cell system. In the fuel cell system according to Embodiment 9, the passage configured to discharge a fluid different from the hydrogen-containing gas to the atmosphere may be connected to the water tank.

The fuel cell system according to Embodiment 9 further includes: a combustor configured to combust the hydrogen-containing gas that is sent out from the reformer; and an air supply device configured to supply combustion air to the combustor. In the fuel cell system according to Embodiment 9, the water tank is in communication with a passage for flue gas via a passage through which water removed from the flue gas flows, and the controller is configured to operate the air supply device when the on-off valve is open.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

The present embodiment describes a case where, in the fuel cell system, a passage extending through the reformer serves as an example of the passage configured to discharge a fluid different from the hydrogen-containing gas to the atmosphere, and a tank storing water recovered from an exhaust fuel gas serves as an example of the water tank.

Other than the above features, the fuel cell system according to the present embodiment may be configured in the same manner as at least one of the fuel cell systems according to Embodiments 1 to 8 and the variations thereof.

Figure 15:
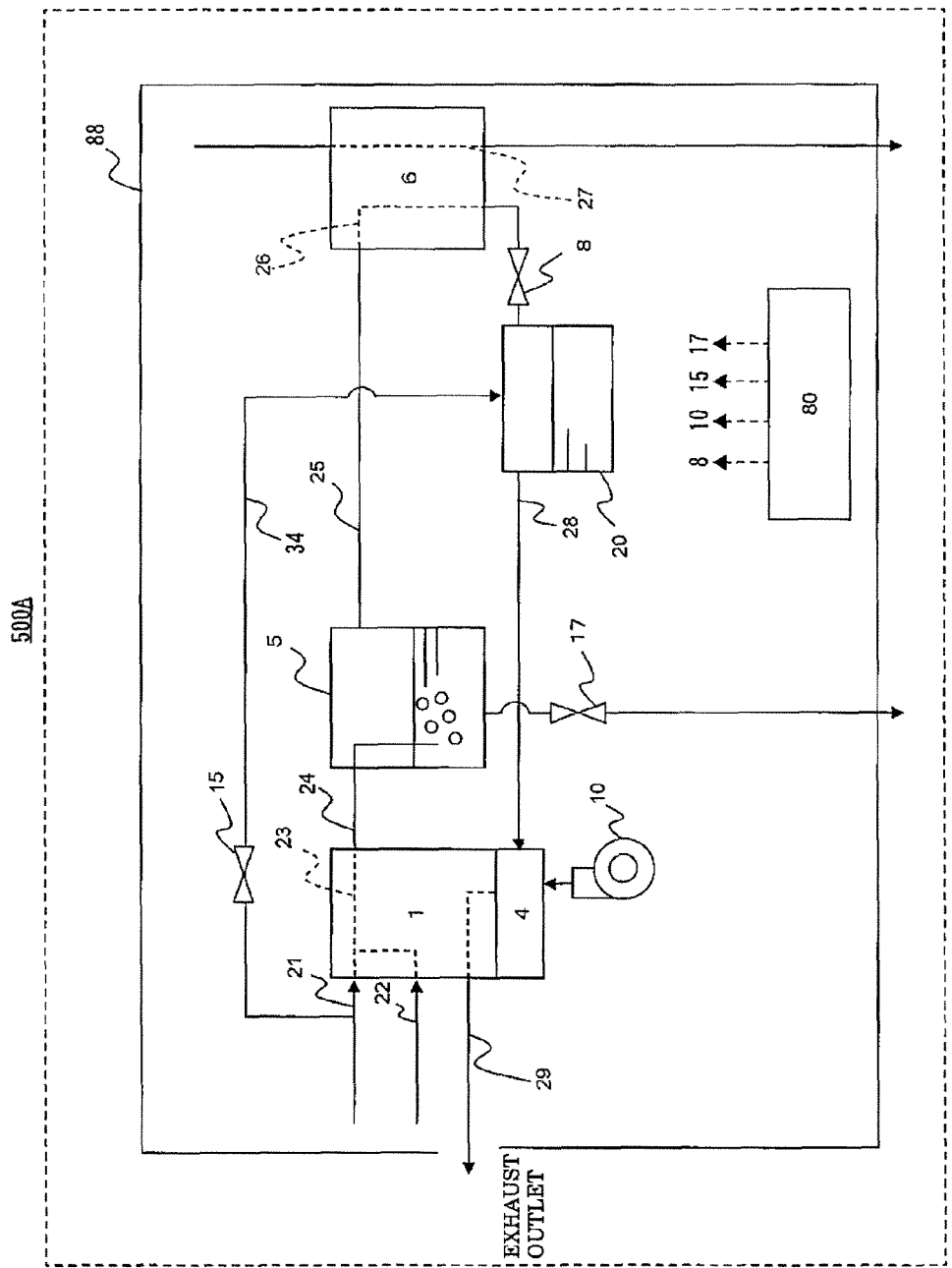
FIG. 15 is a schematic diagram showing an example of a schematic configuration of a fuel cell system according to Embodiment 9.

FIG. 15 is a schematic diagram showing an example of a schematic configuration of the fuel cell system according to Embodiment 9.

A fuel cell system 500A according to Embodiment 9 is such that the fuel cell system 100A according to Embodiment 1 further includes a sixth on-off valve 15, a water tank 20, and a passage 34. The water tank 20 stores water removed from an exhaust fuel gas, and is open to the atmosphere. The passage 34 is a passage branching off from the first water passage 21 and connecting to the water tank 20. The sixth on-off valve 15 is provided on the passage 34.

It should be noted that the passage 34 is exemplified by a passage that branches off at the position B or E shown in FIG. 11. The passage 34 is provided with the sixth on-off valve 15. The sixth on-off valve 15 is communicably connected to the controller 80. The other components of the fuel cell system 500A according to Embodiment 9 are configured in the same manner as components in the fuel cell system 100A. Therefore, such common components between the fuel cell system 500A and the fuel cell system 100A are denoted by the same reference signs and names, and a description of such components will be omitted.

It should be noted that the passage 34 may branch off at any position, so long as the passage 34 branches off from a passage that supplies a reactant to the reforming part 62. The position at which the passage 34 branches off is not limited to the position shown in FIG. 15 but may be, for example, any position from among the positions A to F shown in FIG. 11.

The water draining process of the fuel cell system 500A is performed by opening the second on-off valve 17 when the power generation operation of the fuel cell system 500A is in a stopped state. In the water draining process, at least the sixth on-off valve 15 is opened. It should be noted that the first on-off valve 8 may be either opened or closed in the water draining process.

It is preferred that the sixth on-off valve 15 is opened automatically through control by the controller 80. It is also preferred that the second on-off valve 17 is opened automatically through control by the controller 80. Alternatively, the fuel cell system 500A may be configured such that at least one of the second on-off valve 17 and the sixth on-off valve 15 is manually opened by an operator. In this case, it is preferred that the on-off valve(s) to be manually opened by the operator is provided outside of the casing 88. Then, out of the second on-off valve 17 and the sixth on-off valve 15, an on-off valve that is not manually opened by the operator is automatically opened through control by the controller 80.

According to the above configuration and operations, water within the ammonia remover is properly discharged in the water draining process of the ammonia remover.

In the fuel cell system according to the present embodiment, the fluid passage includes the first fuel gas passage 24, the passage 23 in the reformer 1, the first water passage 21, and the passage 34, and the on-off valve provided on the fluid passage and configured to allow and block the communication between the ammonia remover 5 and the atmosphere corresponds to the sixth on-off valve 15.

Although in the above-described example the passage 34 is used as a part of the fluid passage that allows the ammonia remover 5 to be in communication with the atmosphere during the water draining process of draining water from the inside of the ammonia remover 5, the passage 34 may be used for other purposes. For example, the passage 34 may be used as a part of a fluid passage for releasing an increased internal pressure of the reformer 1 to the atmosphere. To be specific, the reformer 1 is sealed while the power generation operation of the fuel cell system 500A is stopped. At the time, water remaining in the reformer 1 (i.e., in at least one of the reforming part and the evaporating part) evaporates due to residual heat and thereby the internal pressure of the reformer 1 increases. In this case, by opening the sixth on-off valve 15, the reformer 1 becomes open to the atmosphere. As a result, the increase in the internal pressure of the reformer 1 is reduced.

Optionally, in the water draining process of the fuel cell system according to the present embodiment, the combustion air supply device 10 may be operated when the sixth on-off valve 15 is open.

Accordingly, the pressure in the fluid passage that connects the ammonia remover 5 and the combustor 4 increases. As a result, water remaining within the ammonia remover 5 can be drained more efficiently.

Embodiment 10

A fuel cell system according to Embodiment 10 is such that, in any one of the fuel cell systems according to Embodiments 1 to 9 and the variations thereof, the fluid passage is a passage configured to discharge a fluid different from the hydrogen-containing gas to the atmosphere.

The fuel cell system according to Embodiment 9 further includes a water tank open to the atmosphere, which stores water recovered from an exhaust gas in the fuel cell system. In the fuel cell system according to Embodiment 9, the passage configured to discharge a fluid different from the hydrogen-containing gas to the atmosphere may be connected to the water tank.

The fuel cell system according to Embodiment 10 further includes: a combustor configured to combust the hydrogen-containing gas that is sent out from the reformer; and an air supply device configured to supply combustion air to the combustor. In the fuel cell system according to Embodiment 10, the water tank is in communication with a passage for flue gas via a passage through which water removed from the flue gas flows, and the controller is configured to operate the air supply device when the on-off valve is open.

Here, "to operate the air supply device when the on-off valve is open" means operating the air supply device for at least a part of a period over which the on-off valve is open. For example, the air supply device may be operated continuously or intermittently for the period over which the on-off valve is open, or operated only for a part of the period.

The present embodiment describes a case where, in the fuel cell system, a passage extending through the reformer serves as an example of the passage configured to discharge a fluid different from the hydrogen-containing gas to the atmosphere, and a tank storing water recovered from an exhaust fuel gas serves as an example of the water tank.

Other than the above features, the fuel cell system according to the present embodiment may be configured in the same manner as at least one of the fuel cell systems according to Embodiments 1 to 9 and the variations thereof.

Figure 16:
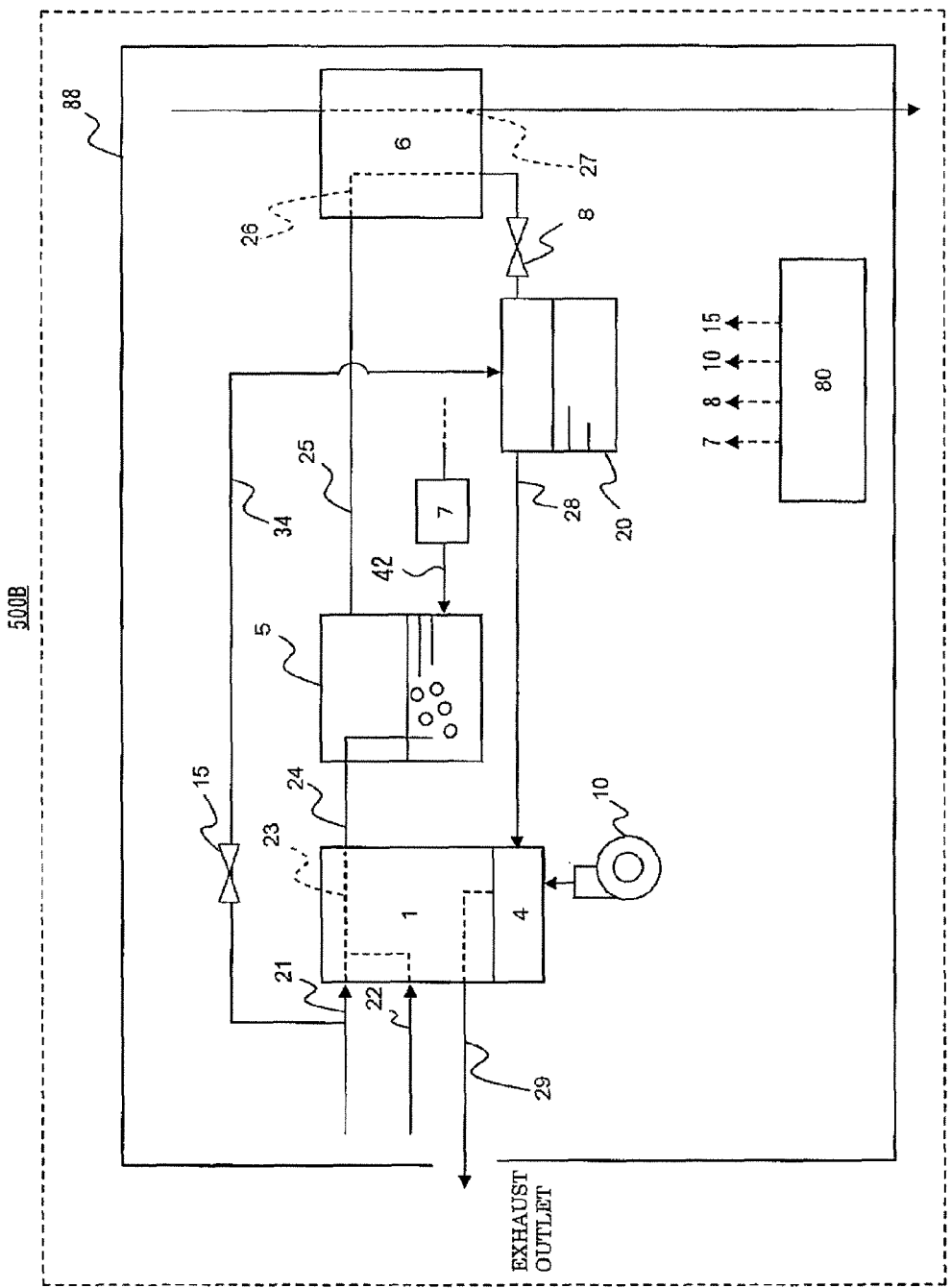
FIG. 16 is a schematic diagram showing an example of a schematic configuration of a fuel cell system according to Embodiment 10.

FIG. 16 is a schematic diagram showing an example of a schematic configuration of the fuel cell system according to Embodiment 10.

A fuel cell system 500B according to Embodiment 10 is such that the fuel cell system 100B according to Embodiment 2 further includes the sixth on-off valve 15, the water tank 20, and the passage 34. The water tank 20 stores water removed from an exhaust fuel gas, and is open to the atmosphere. The passage 34 is a passage branching off from the first water passage 21 and connecting to the water tank 20. The sixth on-off valve 15 is provided on the passage 34.

The passage 34 is exemplified by a passage that branches off at the position B or E shown in FIG. 7. The passage 34 is provided with the sixth on-off valve 15. The sixth on-off valve 15 is communicably connected to the controller 80. The other components of the fuel cell system 500B according to Embodiment 10 are configured in the same manner as components in the fuel cell system 100B. Therefore, such common components between the fuel cell system 500B and the fuel cell system 100B are denoted by the same reference signs and names, and a description of such components will be omitted.

It should be noted that the passage 34 may branch off at any position, so long as the passage 34 branches off from a passage that supplies a reactant to the reforming part 62. The position at which the passage 34 branches off is not limited to the position shown in FIG. 15 but may be, for example, any position from among the positions A to F shown in FIG. 11.

The water loading process of the fuel cell system 500B is performed by opening the sixth on-off valve 15 when the power generation operation of the fuel cell system 500B is in a stopped state. It should be noted that the first on-off valve 8 may be either opened or closed in the water loading process.

It is preferred that the sixth on-off valve 15 is opened automatically through control by the controller 80. However, the fuel cell system 500B may be configured such that the sixth on-off valve 15 is manually opened by an operator. In this case, it is preferred that the on-off valve to be manually opened by the operator is provided outside of the casing 88.

According to the above configuration and operations, water is properly supplied to the inside of the ammonia remover in the water loading process of the ammonia remover.

In the fuel cell system according to the present embodiment, the fluid passage includes the first fuel gas passage 24, the passage 23 in the reformer 1, the first water passage 21, and the passage 34, and the on-off valve provided on the fluid passage and configured to allow and block the communication between the ammonia remover 5 and the atmosphere corresponds to the sixth on-off valve 15.

Although in the above-described example the passage 34 is used as a part of the fluid passage that allows the ammonia remover 5 to be in communication with the atmosphere during the water draining process of draining water from the inside of the ammonia remover 5, the passage 34 may be used for other purposes. In this respect, Embodiment 10 is the same as Embodiment 9.

Optionally, in the water loading process of the fuel cell system according to the present embodiment, the combustion air supply device 10 may be operated when the sixth on-off valve 15 is open.

According to the above configuration, even if a gas that remains in the fluid passage at a position upstream from the combustor 4 contains a combustible gas, the gas is diluted by the combustion air and discharged. This improves safety as compared to a case where the combustor 4 is not operated when the water loading is performed.

The present embodiment or variations thereof may be implemented in combination with Embodiment 1, Embodiment 3, Embodiment 5, Embodiment 7, Embodiment 9, or the variations of these embodiments.

(Other Variations)

The above-described Embodiments 1 to 10 show configuration examples in which the hydrogen-containing gas generator only includes the reformer 1. However, the hydrogen-containing gas generator may include, for example, a shift converter, an oxidizer, and a methanation reactor in addition to the reformer 1. As is well known, the shift converter reduces carbon monoxide in the hydrogen-containing gas through a shift reaction; the oxidizer reduces carbon monoxide in the hydrogen-containing gas through an oxidation reaction; and the methanation reactor reduces carbon monoxide in the hydrogen-containing gas through a methanation reaction. In the above-described configurations, these reactors may be disposed between the ammonia remover 5 and the fuel cell 6. As a result, poisoning, due to ammonia, of catalysts used in these reactions is reduced.

Although the above-described Embodiments 1 to 10 show the reformer 1 of a steam-reforming type as one example, the reformer may be of any of the following types: a steam-reforming type, an autothermal type, a partial oxidation type, and a combination of these types.

Although in the above-described Embodiments 1 to 10 the combustor 4 is configured to heat the reformer 1, the combustor is merely required to have a function of combusting an off gas, and the combustor is not necessarily required to heat the reformer. Such cases where the combustor is not required to heat the reformer include, for example, a case where the reformer 1 is heated by a different heating device and a case where the reformer is configured to not require a supply, from the outside, of heat for use in the reforming. The combustor is not limited to a burner, but may be a catalyst combustor or the like.

Embodiment 11

A fuel cell system according to Embodiment 11 includes: a reformer configured to generate a hydrogen-containing gas by using a raw material; a fuel cell configured to generate electric power by using the hydrogen-containing gas; an ammonia remover configured to cause the hydrogen-containing gas generated in the reformer to come into contact with water, thereby removing ammonia from the hydrogen-containing gas before the hydrogen-containing gas is supplied to the fuel cell; a fluid passage configured to allow the ammonia remover to be in communication with the atmosphere; an on-off valve provided on the fluid passage and configured to allow and block the communication between the ammonia remover and the atmosphere; and a controller configured to open the on-off valve in at least one of a water draining process and a water loading process of the ammonia remover.

The fluid passage is a passage through which the hydrogen-containing gas flows, and the fluid passage includes a plurality of safety mechanisms configured to suppress leakage of the hydrogen-containing gas.

The fuel cell system according to Embodiment 11 further includes: a combustor configured to combust the hydrogen-containing gas that is sent out from the reformer; and an air supply device configured to supply combustion air to the combustor. In the fuel cell system according to Embodiment 11, the fluid passage allows the ammonia remover and the combustor to be in communication with each other, and the controller is configured to operate, in the water draining process, the air supply device when the on-off valve is open.

According to the above configuration, in the water draining process, the pressure in the fluid passage that connects the ammonia remover and the combustor increases. As a result, water remaining within the ammonia remover can be drained more efficiently.

Figure 17:
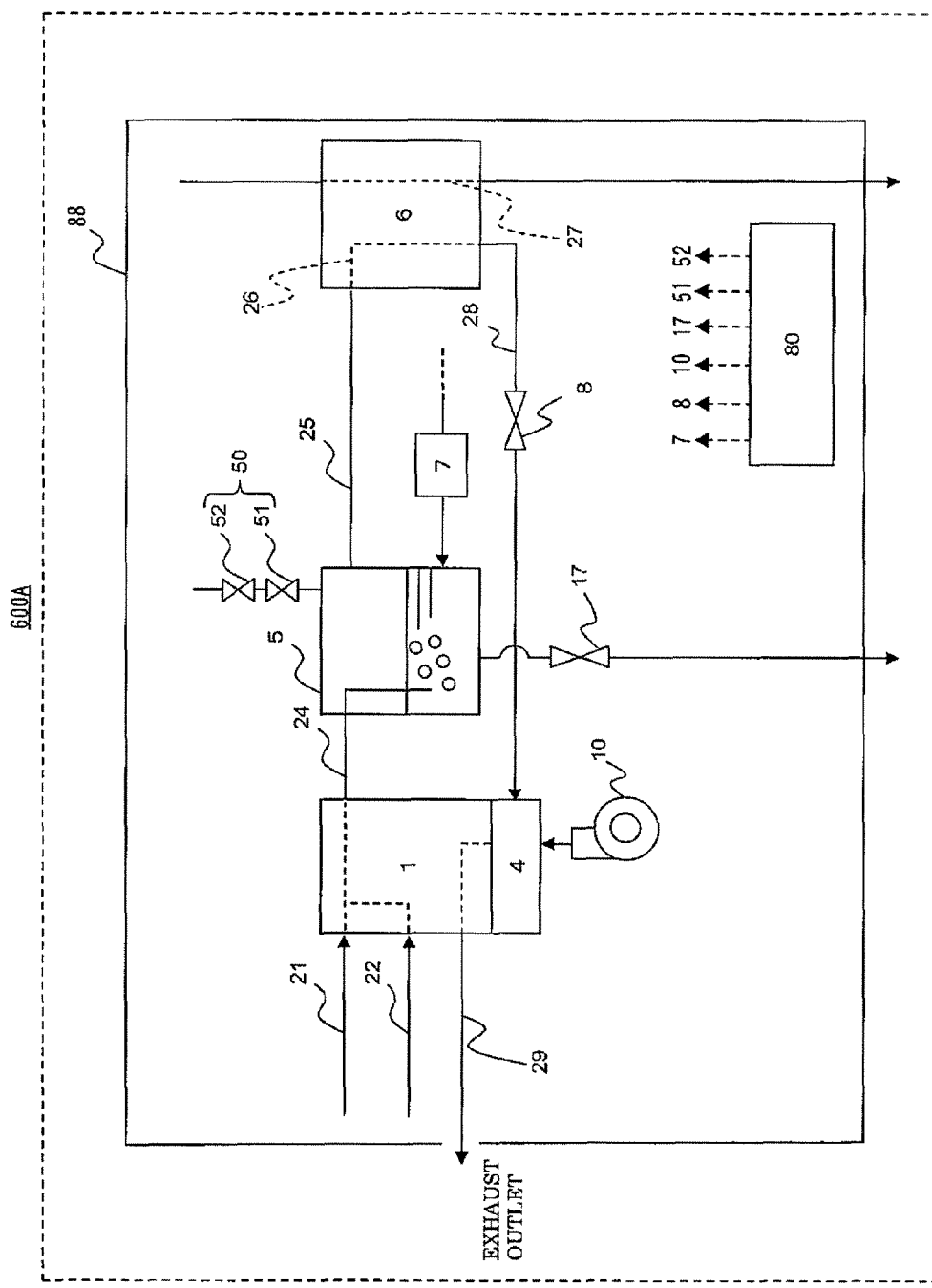
FIG. 17 is a schematic diagram showing an example of a schematic configuration of a fuel cell system according to Embodiment 11.

FIG. 17 is a schematic diagram showing an example of a schematic configuration of the fuel cell system according to Embodiment 11.

It should be noted that, as with Embodiment 1, a fuel cell system 600A includes the first water supply device (not shown) and the raw material supply device (not shown).

A safety mechanism 50 includes a passage open to the atmosphere, the passage being in communication with an opening provided at the upper part of the ammonia remover 5. The passage is provided with a seventh on-off valve 51 and an eighth on-off valve 52. The seventh on-off valve 51 and the eighth on-off valve 52 are communicably connected to the controller 80, and are opened and closed by the controller 80. The controller 80 controls both the seventh on-off valve 51 and the eighth on-off valve 52 such that they are closed at least while the hydrogen-containing gas is flowing within the ammonia remover 5.

According to the above configuration, even if the seventh on-off valve 51 is broken and is not closed, the hydrogen-containing gas does not leak out to the atmosphere so long as the eighth on-off valve 52 is closed. Similarly, according to the above configuration, even if the eighth on-off valve 52 is broken and is not closed, the hydrogen-containing gas does not leak out to the atmosphere so long as the seventh on-off valve 51 is closed.

As in the fuel cell system according to the present embodiment, it is preferred that the fluid passage that allows the ammonia remover 5 to be in communication with the atmosphere is configured to release the hydrogen-containing gas to the atmosphere, and that the fluid passage is provided with a double safety mechanism.

In the present embodiment, the water draining process of the fuel cell system 600A is performed by opening the second on-off valve 17 when the power generation operation of the fuel cell system 600A is in a stopped state. In the water draining process, at least the seventh on-off valve 51 and the eighth on-off valve 52 are opened. It should be noted that the first on-off valve 8 may be either opened or closed in the water draining process.

Optionally, in the water draining process of the fuel cell system according to the present embodiment, the combustion air supply device 10 may be operated when the seventh on-off valve 51 and the eighth on-off valve 52 are open. Accordingly, the pressure in the fluid passage that connects the ammonia remover 5 and the combustor 4 increases. As a result, water remaining within the ammonia remover 5 can be drained more efficiently.

The fuel cell system 600A is configured in the same manner as the fuel cell system 100A according to Embodiment 1, except for the configuration described above. Therefore, common components between FIG. 17 and FIG. 1 are denoted by the same reference signs and names, and a description of such components will be omitted.

It is preferred that the seventh on-off valve 51 and the eighth on-off valve 52 are opened automatically through control by the controller 80. It is also preferred that the second on-off valve 17 is opened automatically though control by the controller 80. Alternatively, the fuel cell system 500A may be configured such that at least one of the second on-off valve 17, and the seventh and eighth on-off valves 51 and 52, are manually opened by an operator. In this case, it is preferred that the on-off valve(s) to be manually opened by the operator is provided outside of the casing 88. Then, out of the second on-off valve 17 and the sixth on-off valve 15, an on-off valve that is not manually opened by the operator is automatically opened through control by the controller 80.

According to the above configuration and operations, water within the ammonia remover is properly discharged in the water draining process of the ammonia remover.

In the present embodiment, the water loading process of the fuel cell system 600A is performed by operating the second water supply device 7 when the power generation operation of the fuel cell system 600A is in a stopped state. In the water loading process, at least the seventh on-off valve 51 and the eighth on-off valve 52 are opened. It should be noted that the first on-off valve 8 may be either opened or closed in the water loading process.

The fuel cell system 600A is configured in the same manner as the fuel cell system 200A according to Embodiment 2, except for the configuration described above. Therefore, common components between FIG. 17 and FIG. 3 are denoted by the same reference signs and names, and a description of such components will be omitted.

In the fuel cell system according to the present embodiment, the fluid passage is open to the atmosphere and is in communication with the opening provided at the upper part of the ammonia remover 5, and the on-off valve provided on the fluid passage and configured to allow and block the communication between the ammonia remover and the atmosphere corresponds to the seventh on-off valve 51 and the eighth on-off valve 52.

Although the above description describes a configuration where both the water loading process and the water draining process are performed, an alternative configuration may be employed where only one of the water loading process and the water draining process is performed. That is, the fuel cell system is configured to perform at least one of the water loading process and the water draining process.

[Variation]

In a fuel cell system according to a variation of Embodiment 11, the fluid passage is a passage through which the hydrogen-containing gas flows, and includes a branch passage that branches off from a passage extending from the reformer to the combustor.

Figure 18:
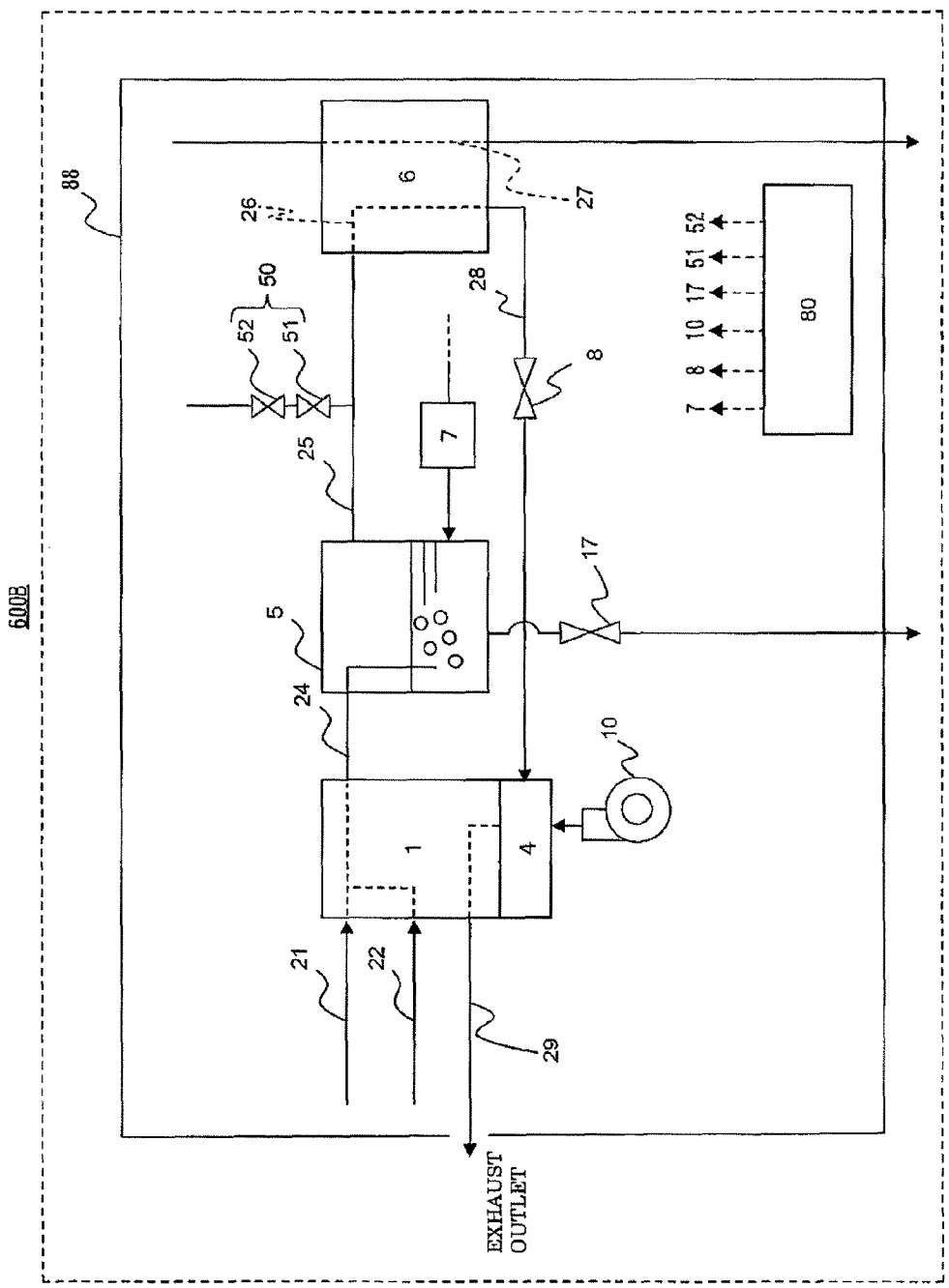
FIG. 18 is a schematic diagram showing an example of a schematic configuration of a fuel cell system according to a variation of Embodiment 11.

FIG. 18 is a schematic diagram showing an example of a schematic configuration of the fuel cell system according to the variation of Embodiment 11.

In a fuel cell system 600B according to the variation of Embodiment 1, the second fuel gas passage 25 includes a branch passage, and the branch passage is provided with the safety mechanism 50.

The fuel cell system 600B is configured in the same manner as the fuel cell system 600A according to Embodiment 11, except for the configuration described above. Therefore, common components between FIG. 18 and FIG. 17 are denoted by the same reference signs and names, and a description of such components will be omitted.

It should be noted that the branch passage may branch off at any position, so long as the branch passage is configured to branch off from a passage extending from the reformer 1 to the combustor 4, through which passage the hydrogen-containing gas flows. For example, the branch passage may be provided at the exhaust fuel gas passage 28.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art.

INDUSTRIAL APPLICABILITY

The fuel cell system according to the present invention is useful as a fuel cell system configured to properly perform at least one of the water loading process and the water draining process of the ammonia remover.

REFERENCE SIGNS LIST 1 reformer
2 first water supply device
3 raw material supply device
4 combustor
5, 5' ammonia remover
6 fuel cell
7 second water supply device
8 first on-off valve
9 water tank
10 combustion air supply device
11 oxidizing gas supply device
12 third on-off valve
13 fourth on-off valve
14 fifth on-off valve
15 sixth on-off valve
16 water sprayer
17 second on-off valve
19 water tank
20 water tank
21 first water passage
22 raw material passage
23 passage
24 first fuel gas passage
25 second fuel gas passage
26 anode-side passage
27 cathode-side passage
28 exhaust fuel gas passage
29 flue gas passage
30 branch passage
31, 32, 34 passage
33 branch passage
42 water supply passage
50 safety mechanism
51 first safety valve
52 second safety valve
61 evaporating part
62 reforming part
74 water-circulation passage
75 water supply device
80 controller
88 casing
100, 200, 300, 400, 500, 600 fuel cell system

The invention claimed is:

1. A fuel cell system comprising:
a reformer that generates a hydrogen-containing gas by using a raw material;
a fuel cell that generates electric power by using the hydrogen-containing gas;
an ammonia remover that removes ammonia from the hydrogen-containing gas generated in the reformer before the hydrogen-containing gas is supplied to the fuel cell;
a fluid passage that allows space in an upper part of the ammonia remover to be in communication with an atmosphere;
an on-off valve that is provided on the fluid passage and allows and blocks the communication between the space in the upper part of the ammonia remover and the atmosphere; and
a controller including a processor and a memory storing a program,
wherein the program, when executed by the processor, causes the controller to perform operations including:
opening the on-off valve in at least one of a water draining process and a water loading process of the ammonia remover.

2. The fuel cell system according to claim 1, wherein the fluid passage includes a passage through which the hydrogen-containing gas flows, and the fluid passage includes a plurality of safety mechanisms that suppresses leakage of the hydrogen-containing gas.

3. The fuel cell system according to claim 1, wherein the fluid passage includes a passage that discharges a fluid different from the hydrogen-containing gas to the atmosphere.

4. The fuel cell system according to claim 3, wherein the passage that discharges a fluid different from the hydrogen-containing gas to the atmosphere is a passage extending through at least one of the reformer and a combustor, and
the combustor combusts the hydrogen-containing gas that is sent out from the reformer.

5. The fuel cell system according to claim 3, further comprising
a water tank which is open to the atmosphere, and stores water recovered from an exhaust gas in the fuel cell system, wherein
the passage that discharges a fluid different from the hydrogen-containing gas to the atmosphere is connected to the water tank.

6. The fuel cell system according to claim 1, further comprising:
a combustor that combusts the hydrogen-containing gas that is sent out from the reformer; and
an air supply device that supplies combustion air to the combustor, wherein:
the fluid passage is a passage downstream from the ammonia remover and extends through the combustor, and
the program, when executed by the processor, further causes the controller to perform operations including:
operating the air supply device when the on-off valve is open.

7. The fuel cell system according to claim 5, further comprising:
a combustor that combusts the hydrogen-containing gas that is sent out from the reformer; and
an air supply device that supplies combustion air to the combustor, wherein
the water tank is in communication with a passage for a flue gas via a passage through which water removed from the flue gas flows, and
the program, when executed by the processor, further causes the controller to perform operations including:
operating the air supply device when the on-off valve is open.

8. The fuel cell system according to claim 5, further comprising
an air supply device that supplies air as an oxidizing gas to the fuel cell, wherein:
the water tank is a tank which stores water removed from an off oxidizing gas discharged from the fuel cell, and
the program, when executed by the processor, further causes the controller to perform operations including:
operating the air supply device when the on-off valve is open.

9. A method of operating a fuel cell system, comprising:
removing, by an ammonia remover, ammonia from a hydrogen-containing gas generated in a reformer before the hydrogen-containing gas is supplied to a fuel cell;

performing at least one of a water draining process and a water loading process, the water draining process being a process of draining water from inside of the ammonia remover to outside of the fuel cell system, the water loading process being a process of loading water into the ammonia remover; and in at least one of the water draining process and the water loading process, opening an on-off valve provided on a fluid passage configured to allow space in an upper part of the ammonia remover to be in communication with an atmosphere, the on-off valve being configured to allow and block the communication between the space in the upper part of the ammonia remover and the atmosphere.

10. The method according to claim 9, wherein the fluid passage includes a passage through which the hydrogen-containing gas flows, and includes a plurality of safety mechanisms that suppresses leakage of the hydrogen-containing gas.

11. The method according to claim 9, wherein the fluid passage includes a passage that discharges a fluid different from the hydrogen-containing gas to the atmosphere.

12. The method according to claim 11, wherein:
the passage that discharges a fluid different from the hydrogen-containing gas to the atmosphere is a passage extending through at least one of the reformer and a combustor, and
the method further comprises combusting in the combustor the hydrogen-containing gas that is sent out from the reformer.

13. The method according to claim 11, wherein:
the fuel cell system further comprises a water tank which is open to the atmosphere, and stores water recovered from an exhaust gas in the fuel cell system,
the passage that discharges a fluid different from the hydrogen-containing gas to the atmosphere is connected to the water tank.

14. The method according to claim 9, wherein:
the fuel cell system further comprises:
a combustor that combusts the hydrogen-containing gas that is sent out from the reformer; and
an air supply device that supplies combustion air to the combustor,
the fluid passage is a passage downstream from the ammonia remover and extends through the combustor, and
the method further comprises operating the air supply device when the on-off valve is open.

15. The method according to claim 13, wherein:
the fuel cell system further comprises:
a combustor that combusts the hydrogen-containing gas that is sent out from the reformer; and
an air supply device that supplies combustion air to the combustor,
the water tank is in communication with a passage for a flue gas via a passage through which water removed from the flue gas flows, and
the method further comprises operating the air supply device when the on-off valve is open.

16. The method according to claim 13, wherein:
the fuel cell system further comprises an air supply device that supplies air as an oxidizing gas to the fuel cell,
the water tank is a tank which stores water removed from an off oxidizing gas discharged from the fuel cell, and
the method further comprises operating the air supply device when the on-off valve is open.

* * * * *